(12) United States Patent
Lu et al.

(10) Patent No.: US 9,645,681 B2
(45) Date of Patent: May 9, 2017

(54) OPTICAL TOUCH DISPLAY SYSTEM

(75) Inventors: Chih-Hung Lu, Hsin-Chu (TW);
Hsin-Chia Chen, Hsin-Chu (TW);
En-Feng Hsu, Hsin-Chu (TW);
Chi-Chieh Liao, Hsin-Chu (TW);
Ren-Hau Gu, Hsin-Chu (TW);
Shu-Sian Yang, Hsin-Chu (TW);
Yu-Hao Huang, Hsin-Chu (TW)

(73) Assignee: PixArt Imaging Inc., Hsin-Chu (TW)

(*) Notice: Subject to any disclaimer, the term of this patent is extended or adjusted under 35 U.S.C. 154(b) by 441 days.

(21) Appl. No.: 13/288,035

(22) Filed: Nov. 3, 2011

(65) Prior Publication Data
US 2012/0044213 A1 Feb. 23, 2012

Related U.S. Application Data

(63) Continuation-in-part of application No. 12/817,172, filed on Jun. 16, 2010, and a continuation-in-part of
(Continued)

(30) Foreign Application Priority Data

Sep. 23, 2009 (TW) .............................. 98132086 A
Dec. 3, 2009 (TW) .............................. 98141344 A
Apr. 8, 2011 (TW) ............................. 100112274 A

(51) Int. Cl.
*G06F 3/042* (2006.01)
*G01S 7/491* (2006.01)
(Continued)

(52) U.S. Cl.
CPC ............ *G06F 3/0428* (2013.01); *G01S 7/491* (2013.01); *G01S 7/497* (2013.01); *G01S 17/08* (2013.01); *G01S 17/48* (2013.01)

(58) Field of Classification Search
CPC ...... G06F 3/042; G06F 3/0421; G06F 3/0423; G06F 3/0425; G06F 2203/04101; G06F 2203/04109
See application file for complete search history.

(56) References Cited

U.S. PATENT DOCUMENTS 5,483,261 A * 1/1996 Yasutake ............ G06K 9/00335
178/18.03
5,808,726 A 9/1998 Egawa
(Continued)

FOREIGN PATENT DOCUMENTS

CN 101546235 A 9/2009
TW 200514966 5/2005
(Continued)

*Primary Examiner* — William Boddie
*Assistant Examiner* — Jeffrey A Parker
(74) *Attorney, Agent, or Firm* — Winston Hsu; Scott Margo

(57) ABSTRACT

Optical touch display system includes a light source, a reflector, an image sensor, and a processing device. The light source emits light to at least one object directly and emits light to the at least one object via the reflector at the same time. Then the image sensor receives light reflected from the at least one object directly and light reflected via the reflector simultaneously to form a set of imaging objects which have similar color parameters on an image. Then the processing device produces a set of still image parameters of the image objects such as gravity centers and border boundaries. Based on the still image parameters, the processing device determines the coordinates of the least one object on the optical touch display.

8 Claims, 17 Drawing Sheets

Related U.S. Application Data application No. 12/842,045, filed on Jul. 23, 2010, now Pat. No. 8,514,375.

(51) Int. Cl.
*G01S 7/497* (2006.01)
*G01S 17/08* (2006.01)
*G01S 17/48* (2006.01)

(56) References Cited

U.S. PATENT DOCUMENTS

| | | | |
|---|---|---|---|
| 6,323,942 B1 | 11/2001 | Bamji | |
| 6,350,981 B1 | 2/2002 | Uno | |
| 6,370,331 B1 | 4/2002 | Okubo | |
| 6,549,058 B1 | 4/2003 | Bondarev | |
| 6,678,039 B2 | 1/2004 | Charbon | |
| 6,871,017 B2 | 3/2005 | Numako | |
| 7,006,142 B2 | 2/2006 | Seo | |
| 7,009,690 B2 | 3/2006 | Kamon | |
| 7,186,965 B2 | 3/2007 | Schrey | |
| 7,212,278 B2 | 5/2007 | Doemens | |
| 7,742,637 B2 | 6/2010 | Xiao | |
| 7,847,260 B2 | 12/2010 | Inbar | |
| 8,514,375 B2 | 8/2013 | Hsu | |
| 2002/0015144 A1 | 2/2002 | Seo | |
| 2005/0088641 A1 | 4/2005 | Hung | |
| 2009/0009622 A1 | 1/2009 | Yoshida | |
| 2009/0128829 A1 | 5/2009 | Schillke | |
| 2009/0219251 A1 | 9/2009 | Jung | |
| 2009/0244018 A1* | 10/2009 | Lin et al. | 345/173 |
| 2009/0262098 A1* | 10/2009 | Yamada | 345/175 |
| 2010/0231692 A1 | 9/2010 | Perlman | |
| 2010/0295821 A1* | 11/2010 | Chang | G06F 3/0421 345/175 |
| 2011/0134222 A1 | 6/2011 | Yahav | |
| 2011/0291988 A1* | 12/2011 | Bamji | G06F 3/0428 345/175 |
| 2012/0268727 A1 | 10/2012 | Schrey | |

FOREIGN PATENT DOCUMENTS

| | | |
|---|---|---|
| TW | 200714867 | 4/2007 |
| TW | 200825381 | 6/2008 |
| TW | 200839192 | 10/2008 |
| TW | 200900658 | 1/2009 |
| TW | M364920 | 9/2009 |
| WO | 2009127347 A1 | 10/2009 |

* cited by examiner

OPTICAL TOUCH DISPLAY SYSTEM

CROSS REFERENCE TO RELATED APPLICATIONS

This application is a continuation-in-part of U.S. application Ser. No. 12/817,172, filed on Jun. 16, 2010, entitled "Distance-measuring device, 3D image-sensing device, and optical touch system" and No. 12/842,045, filed on Jul. 23, 2010, entitled "Distance-measuring device of measuring distance according to variation of imaging location and calibrating method thereof", the contents of which are incorporated herein in their entirety.

BACKGROUND OF THE INVENTION

1. Field of the Invention

The present invention is related to an optical touch display system, and more particularly, to an optical touch display system for multiple touch points.

2. Description of the Prior Art

Modern touch display technologies are already widely applied in electronic products of all kinds, e.g. Automated Teller Machine (ATM), handheld electronic devices and display devices. Generally, touch display technologies can be found in three types: resistive, capacitative and optical, wherein resistive and capacitative touch displays position an object via detecting variations in electric fields on surfaces of the touch displays when the object comes in contact with a sensing device. On the other hand, an optical touch display positions an object by detecting interruptions in light paths or light variations caused by the object moving on the surface of the touch display.

Since touch devices utilizing optical touch display technologies do not require special manufacturing processes or components, and also manufacturing costs are little affected by dimensions, optical touch technology is a more cost-effective solution than resistive and capacitative touch displays for larger-scale applications. To achieve a light-weight structure, optical touch display technologies often dispose image sensors at corners of touch screens and utilize triangulation to determine coordinates of a touch object from different angles. However, for two or more touch objects, measurement accuracy is reduced due to shadowing and obstruction of light paths, resulting in less accurate or incorrect coordinates (ghost coordinates), causing inconvenience for various applications.

SUMMARY OF THE INVENTION

The present invention discloses an optical touch display system. The optical touch display system comprises a touch region; a light source, disposed on a periphery of the touch region, the light source positioned at least partially above the touch region, such that light rays emitted from the light source may traverse the touch region; a reflector, disposed on at least a part of the periphery of the touch region, for reflecting the light rays emitted from the light source and generating a mirrored image of the touch region; an image sensor, disposed above the light source, for receiving light rays of the light source, reflected from a set of touch points on the touch region and the reflector, and generating a two-dimensional image accordingly; wherein the two-dimensional image comprises a set of optical images, the set of optical images comprising a set of real images corresponding to the set of touch points, and a set of virtual images corresponding to the set of touch points, generated by the light rays from the light source reflected by the reflector; and a processing device, for generating a set of output coordinates corresponding to the set of touch points according to positions of the set of real images and the set of virtual images in the two-dimensional image.

The present invention further discloses an optical touch display system. The optical touch display system comprises a touch region; a light source, on a periphery of the touch region, the light source positioned at least partially above the touch region, such that light rays emitted from the light source may traverse the touch region; an image sensor, disposed above the light source, for receiving light rays of the light source, reflected from a set of touch points on the touch region, and generating a two-dimensional image accordingly; wherein the two-dimensional image comprises a set of optical images corresponding to the set of touch points; a distance measurement device, connected to the light source and the image sensor, for controlling the light source and the image sensor, and generating a set of image distances corresponding to the set of optical images according to coordinates of the set of optical images in the two-dimensional image along a first direction; an angle measurement device, connected to the image sensor, for generating a set of image angles corresponding to the set of optical images according to coordinates of the set of optical images in the two-dimensional image along a second direction; and a processor, for generating a set of output coordinates according to the set of image distances and the set of image angles.

The present invention further discloses an optical touch display system. The optical touch display system comprises a touch region; a light source, disposed on a periphery of the touch region, the light source positioned at least partially above the touch region, such that light rays emitted from the light source may traverse the touch region; a first image sensor, disposed above the light source, for receiving light rays of the light source, reflected from a set of touch points on the touch region, and generating a first two-dimensional image accordingly; wherein the first two-dimensional image comprises a first set of real images corresponding to the set of touch points; a second image sensor, disposed on the periphery of the touch region, for receiving light rays of the light source, reflected from the set of touch points on the touch region, and generating a second two-dimensional image accordingly; wherein the second two-dimensional image comprises a second set of real images corresponding to the set of touch points; a distance measurement device, connected to the light source and the first image sensor, for controlling the first image sensor and the light source, and generating a first set of image distances corresponding to the first set of real images according to coordinates of the first set of real images in the two-dimensional image along a first direction; and a processor, for generating a first set of real-image lines according to the first set of real images and a position of the first image sensor in the first two-dimensional image, and generating a second set of real-image lines according to the second set of real images and a position of the second image sensor in the second two-dimensional image, and the processing device generates a set of candidate coordinates corresponding to the set of touch points according to the first set of real-image lines and the second set of real-image lines, and generates a set of output coordinates corresponding to the set of touch points according to the set of candidate coordinates and the first set of image distances.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
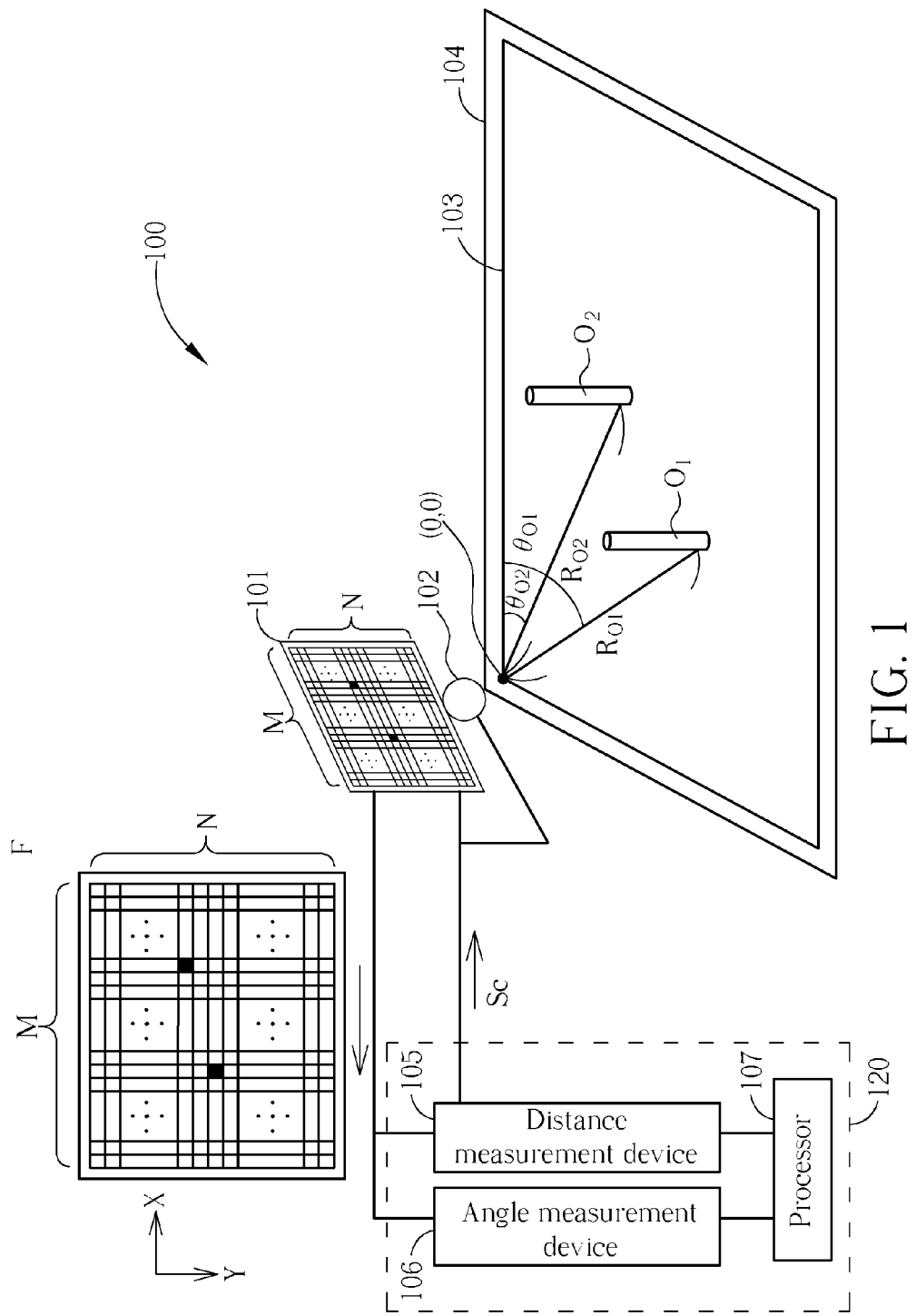
FIG. 1 is a schematic diagram of an optical touch display system according to a first embodiment of the present invention.

Please refer to FIG. 1, which is a schematic diagram of an optical touch display system 100 according to a first embodiment of the present invention. The optical touch display system 100 includes an image sensor 101, a light source 102, a touch region 103, a light absorption component 104, and a processing device 120. The processing device 120 includes a distance measurement device 105, an angle measurement device 106, and a processor 107. The optical touch display system 100 is capable of detecting multiple touch points. Moreover, the distance measurement device 105 further controls the image sensor 101 and the light source 102 via a control signal $S_C$. In FIG. 1, only two touch points $O_1$, $O_2$ are shown for illustrative purposes. Moreover, relative positions of components in FIG. 1 are shown for illustration, and in reality the components may be disposed differently. In reality, a lens LN is disposed on a sensing side of the image sensor 101 in the optical touch display system 100, such that all incident light rays to the image sensor 101 pass through the lens LN. However, the lens LN is omitted from FIG. 1 for simplicity.

Preferably, the touch region 103 is set to a rectangle, and the light absorption component 104 is disposed on a periphery of the touch region 103, for absorbing light rays of the light source 102 such that light rays of the light source 102 are not reflected back to the image sensor 101. However, the touch region 103 can also be set to a trapezoid, or other polygonal shapes, according to user requirements. The light source 102 is disposed on the periphery of the touch region 103; preferably, the light source 102 is positioned at least partially above a corner of the touch region touch region 103, such that light rays emitted from the light source 102 may traverse the touch region 103. The image sensor 101 is disposed close to the light source 102; preferably, the image sensor 101 is disposed above the light source 102. Moreover, the light source 102 may be a two-dimensional light source, including a linear light source and a light source conversion device, wherein the linear light source is generated via a laser diode or a Light Emitting Diode (LED); the light source conversion device converts the linear light source to the two-dimensional light source, to generate light rays on the touch region 103; the light source conversion device may be a cylindrical lens, a Diffractive Optical Element (DOE) or a MEMS micro mirror module.

The image sensor 101 contains a light sensing array constituted from M columns and N rows of sensing units, and generates a two-dimensional image F with a resolution of M by N. More specifically, in Cartesian coordinates, the two-dimensional image F has a resolution of M along an X-axis and a resolution of N along a Y-axis.

In one embodiment, the present invention employs a polar coordinate system for the touch region 103. As shown in FIG. 1, the origin (0,0) of the polar coordinate system is defined as a top-left corner of the touch region 103, and the polar axis is defined as a top boundary of the touch region 103. Preferably, the image sensor 101 is disposed at the top-left corner of the touch region, i.e. polar coordinates of the image sensor 101 is also the origin (0,0); the light source 102 is also disposed at the top-left corner of the touch region, i.e. polar coordinates of the light source 102 is also the origin (0,0). Therefore, a position of an object on the touch region 103 is represented by a distance R from the top-left corner of the touch region 103, and an angle θ from the top boundary of the touch region 103.

The distance measurement device 105 and the angle measurement device 106 measures an image distance and image angle of the touch point according to positions of an optical image generated by light rays reflected from the touch point in the two-dimensional image F. More specifically, the distance measurement device 105 calculates the distance of the touch point according to a position of the optical image in the two-dimensional image F along the Y-axis; the angle measurement device 106 calculates the angle of the touch point according to a position of the optical image in the two-dimensional image F along the X-axis. The processing device 107 further outputs the position of the touch point (in distance and angle) according to information obtained by the distance measurement device 105 and the angle measurement device 106.

Figure 2:
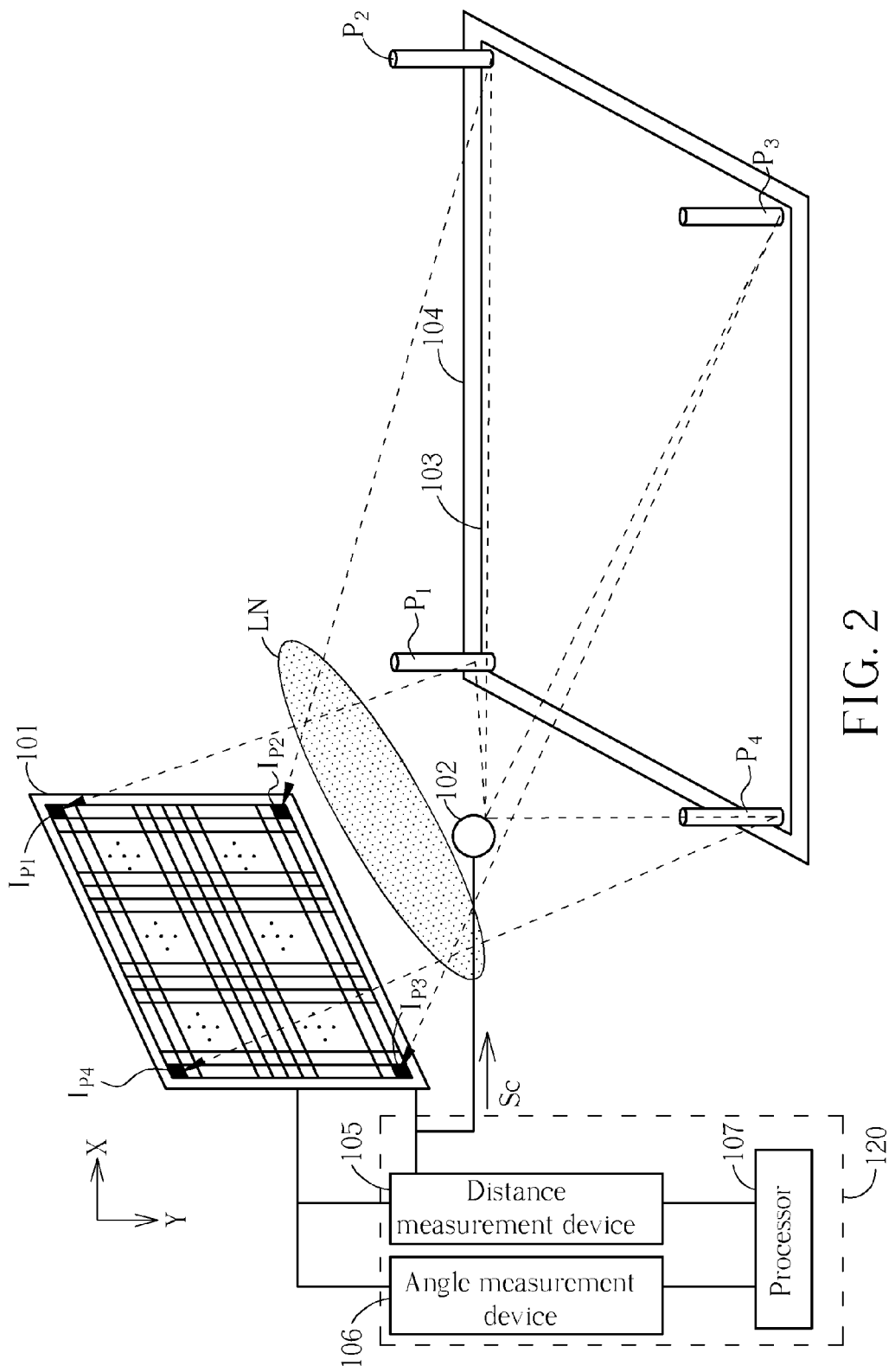
FIG. 2 is a schematic diagram of the optical touch display system during a calibration stage according to the first embodiment of the present invention.

Please refer to FIG. 2, which is a schematic diagram illustrating the optical touch display system 100 during a calibration stage. Before starting to detect the position of the touch point, the optical touch display system 100 may first undergo a calibration stage. The following illustrates operations of the optical touch display system 100 of the present invention during the calibration stage. For the same illustrative purposes, the lens LN is omitted from FIG. 2.

During the calibration stage, calibration objects $P_1$, $P_2$, $P_3$, $P_4$ can be disposed at each of four corners of the touch region 103, corresponding to coordinates $(R_{P1}, \theta_{P1})$, $(R_{P2}, \theta_{P2})$, $(R_{P3}, \theta_{P3})$, $(R_{P4}, \theta_{P4})$, respectively. The light source 102 emits light rays at the calibration objects $P_1$, $P_2$, $P_3$, and $P_4$, respectively; the calibration objects $P_1$, $P_2$, $P_3$, and $P_4$ reflect the light rays from the light source 102 to the image sensor 101. Here, it is assumed that the calibration objects $P_1$, $P_2$, $P_3$, $P_4$ respectively form images on the sensing units $CS_{(M, 0)}$, $CS_{(M,N)}$, $CS_{(0,N)}$, $CS_{(0,0)}$ (assumed for illustrative purposes only, and may differ in reality). In other words, coordinates of optical images $I_{P1}$, $I_{P2}$, $I_{P3}$, $I_{P4}$ corresponding to the calibration objects $P_1$, $P_2$, $P_3$, $P_4$ on the two-dimensional image F are (M,0), (M,N), (0,N), (0,0), respectively. Since that the calibration objects $P_1$~$P_4$ are disposed at corners of the touch region, and that a length and width of the touch region 103 are both known, and providing that the origin (0,0) is defined as the top-left corner of the touch region, it follows that $(R_{P1}, \theta_{P1})$, $(R_{P2}, \theta_{P2})$, $(R_{P3}, \theta_{P3})$, $(R_{P4}, \theta_{P4})$ may be mathematically determined. For example, assuming the length and width of the touch region 103 are $R_L$ and $W_L$, then $(R_{P1}, \theta_{P1})$, $(R_{P2}, \theta_{P2})$, $(R_{P3}, \theta_{P3})$, $(R_{P4}, \theta_{P4})$ may be expressed (0,0), $(R_L,0)$, $((R_L^2+W_L^2)^{1/2}, \tan^{-1}(W_L/R_L))$, $(W_L, 90°)$, respectively. As such, in the case of the calibration objects $P_3$ and $P_4$, the distance measurement device 105 can know that a distance difference of N along the Y-axis in the two-dimensional image F is equivalent to a distance difference of $W_L$ in actual space. Thus, a distance of an object from the origin on the touch region 103 may be derived, via interpolation, from a position of a corresponding optical image along the Y-axis in the two-dimensional image F. In the case of the calibration objects $P_1$ and $P_3$, the angle measurement device 106 knows that a distance difference of M along the X-axis in the two-dimensional image F is equivalent to an actual angle difference of 90°. Thus, an angle of an object from the polar axis on the touch region 103 may be derived from a position of a corresponding optical image along the X-axis in the two-dimensional image F, via interpolation. Moreover, in the above-mentioned calibration method, different variations according to user requirements are possible, e.g. different positions or a different quantity of the calibration objects, etc.

Figure 3:
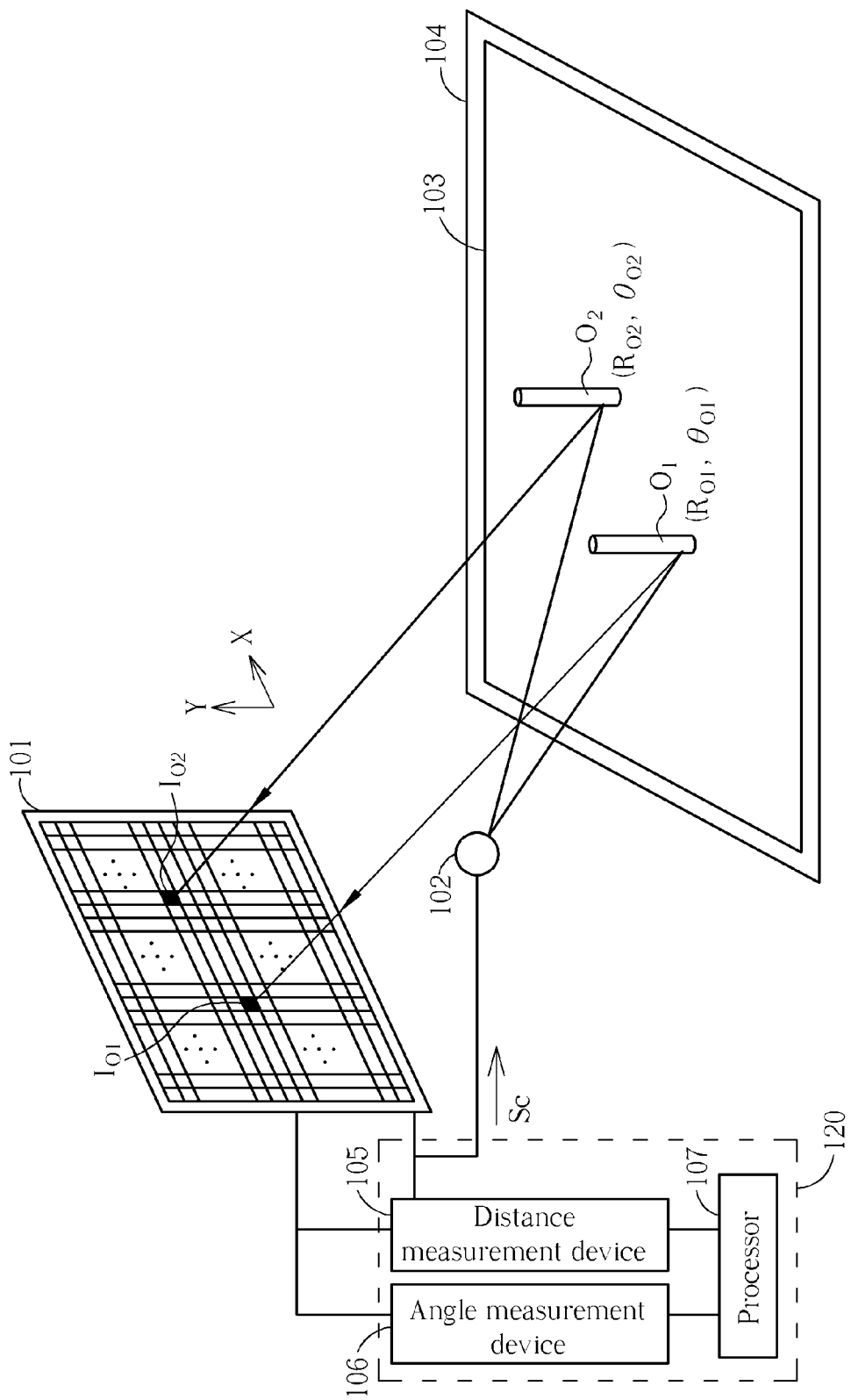
FIG. 3 is a schematic diagram the optical touch display system under normal operation according to the first embodiment of the present invention.

Please refer to FIG. 3, which is a schematic diagram of the optical touch display system 100 during normal operation according to the present invention. During normal operation, the light source 102 emits the light rays to the touch point $O_1$; the touch point $O_1$ reflects the light rays emitted from the light source 102 back to the image sensor 101, and an image is formed on the sensing unit $CS_{(X1,Y1)}$. In other words, the touch point $O_1$ corresponds to an optical image $I_{O1}$ with coordinates $(X_1,Y_1)$ in the two-dimensional image F. Since the coordinate relationship between the touch region 103 and the two-dimensional image F can be known by the distance measurement device 105 and the angle measurement device 106 after the calibration stage, it is possible to calculate that a position of the touch point $O_1$ in the touch region 103 is at $(R_{O1}, \theta_{O1})$. A position of the touch point $O_2$ may be calculated in a way similarly to the touch point $O_1$, and not further described herein.

Figure 4:
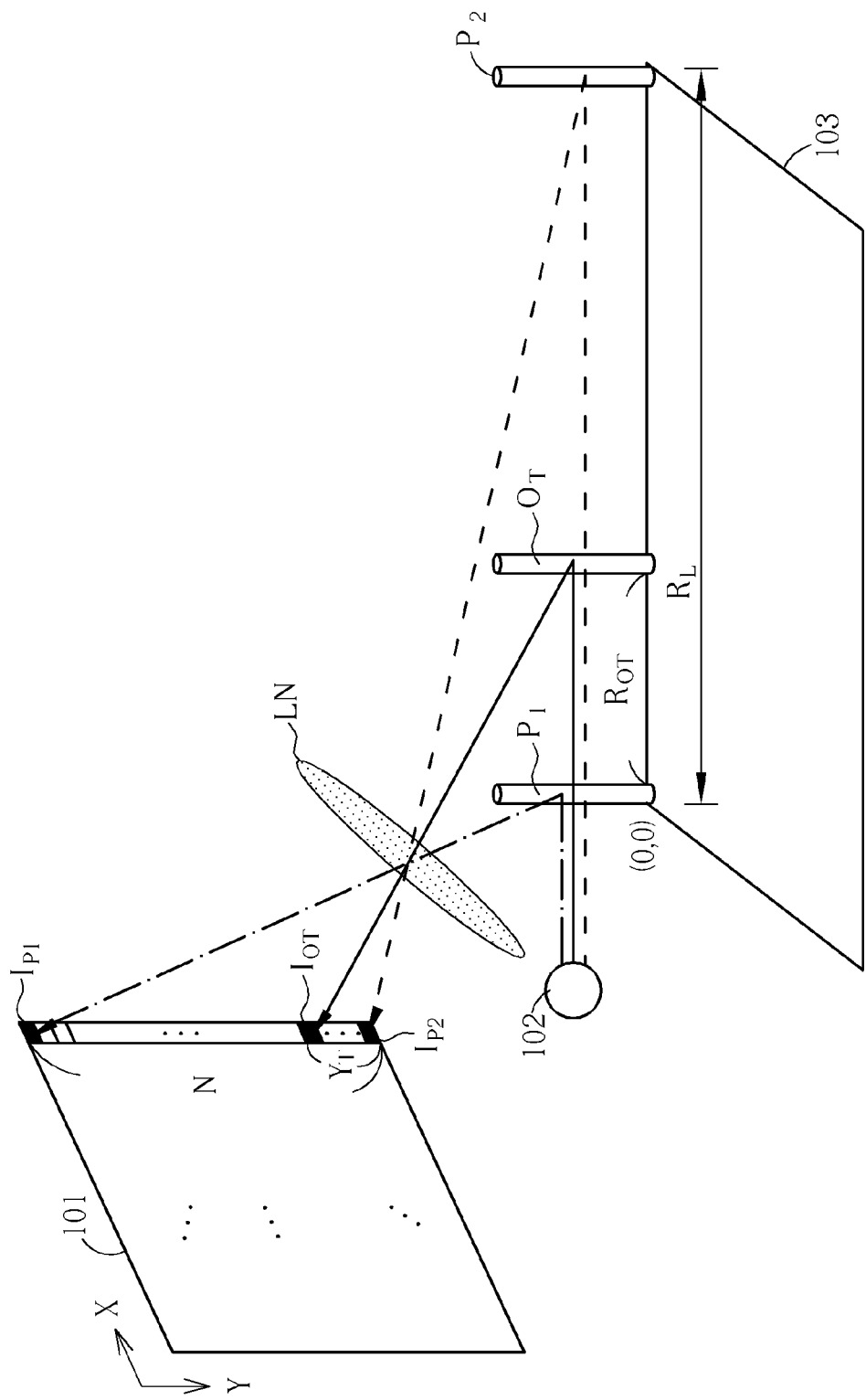
FIG. 4 is a side-view schematic diagram of the optical touch display system according to the first embodiment of the present invention.

Please refer to FIG. 4, which is a side-view schematic diagram of the optical touch display system 100. FIG. 4 illustrates how the distance measurement device 105 measures the distance R, and uses the calibration objects $P_1$, $P_2$ and the touch point $O_T$ as an example. Furthermore, the lens LN shown in FIG. 4 illustrates that all inflecting light rays of the image sensor 101 pass through the lens LN, therefore resulting in image positions as shown in FIG. 4. It may be assumed that the calibration objects $P_1$ and $P_2$ are spaced apart by a known distance $R_L$, and correspond to optical images $I_{P1}$ and $I_{P2}$ in the two-dimensional image F, with coordinates (M,N) and (M,0), respectively. It follows that, $R_{OT}$, a distance of the touch point $O_T$ to be detected by the distance measurement device 105, may be derived from a position of an optical image $I_{OT}$ (corresponding to the touch point $O_T$) relative to the optical images $I_{P1}$, $I_{P2}$ along the Y-axis in the two-dimensional image F. More specifically, suppose the optical image $I_{OT}$ is at $(X_T, Y_T)$, then the distance $R_{OT}$ may be expressed as follows: $R_{OT}=(Y_T/N) \times R_L$.

Figure 5:
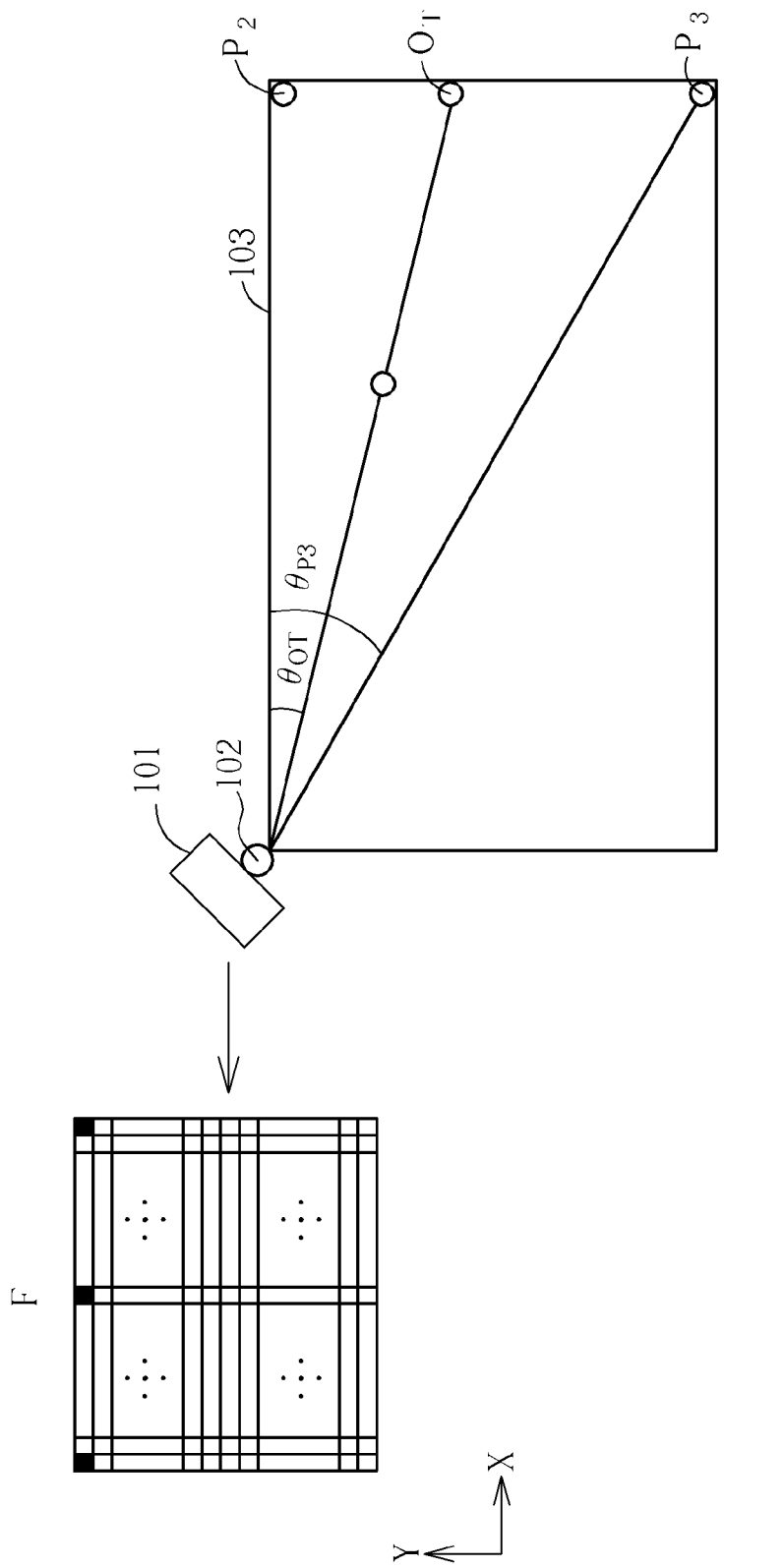
FIG. 5 is a top-view schematic diagram of the optical touch display system according to the first embodiment of the present invention.

Please refer to FIG. 5, which is a top-view of the optical touch display system 100. FIG. 5 illustrates how the angle measurement device 106 measures the angle θ, using the calibration objects $P_2$, $P_3$ as an example. Assume that an angle $\Theta_{P3}$ between the calibration objects $P_2$ and $P_3$ is known (e.g. $\tan^{-1}(W_L/R_L)$), and that the calibration objects $P_2$ and $P_3$ correspond to optical images $I_{P2}$ and $I_{P3}$, at positions (M,N) and (0,N), respectively. It follows that the angle $\theta_{OT}$ of the touch point $O_T$ to be detected by the angle measurement device 106 may be derived from the position of the optical image $I_{OT}$ relative to the optical images $I_{P2}$ and $I_{P3}$ along the X-axis in the two-dimensional image F. More specifically, suppose the optical image $I_{OT}$ is at $(X_T, Y_T)$, then the angle $\theta_{OT}$ may be expressed by the following: $\theta_{OT}=(X_T/M) \times \theta_{P3}$.

Figure 6:
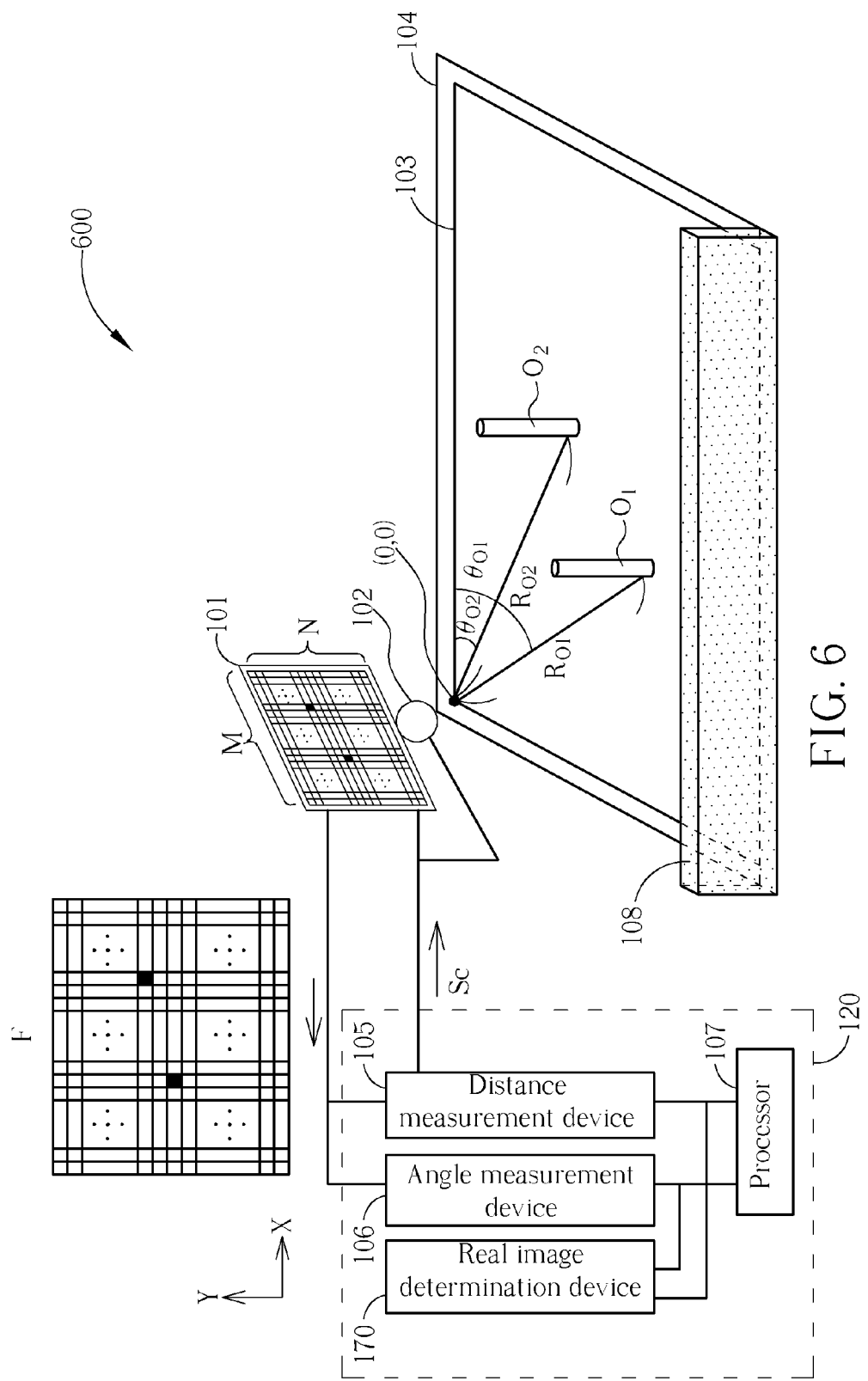
FIG. 6 is a schematic diagram of an optical touch display system according to a second embodiment of the present invention.

Please refer to FIG. 6, which is a schematic diagram of an optical touch display system 600 according to a second embodiment of the present invention. Compared with the optical touch display system 100, the optical touch display system 600 is configured with an extra reflector 108, for enhancing accuracy of determining positions of the touch points. Furthermore, the processing device 120 of the optical touch display system 600 may optionally include a real image determination device 170. In the following, it is assumed that it is known whether the optical images in the two-dimensional image F are real images or not. Moreover, those skilled in the art may derive other cases according to the aforementioned relationship between positions of an object in the touch region and its corresponding optical image in the two-dimensional image. Therefore, for illustrative purposes, the following mainly describes positions of objects within the touch region.

Figure 7:
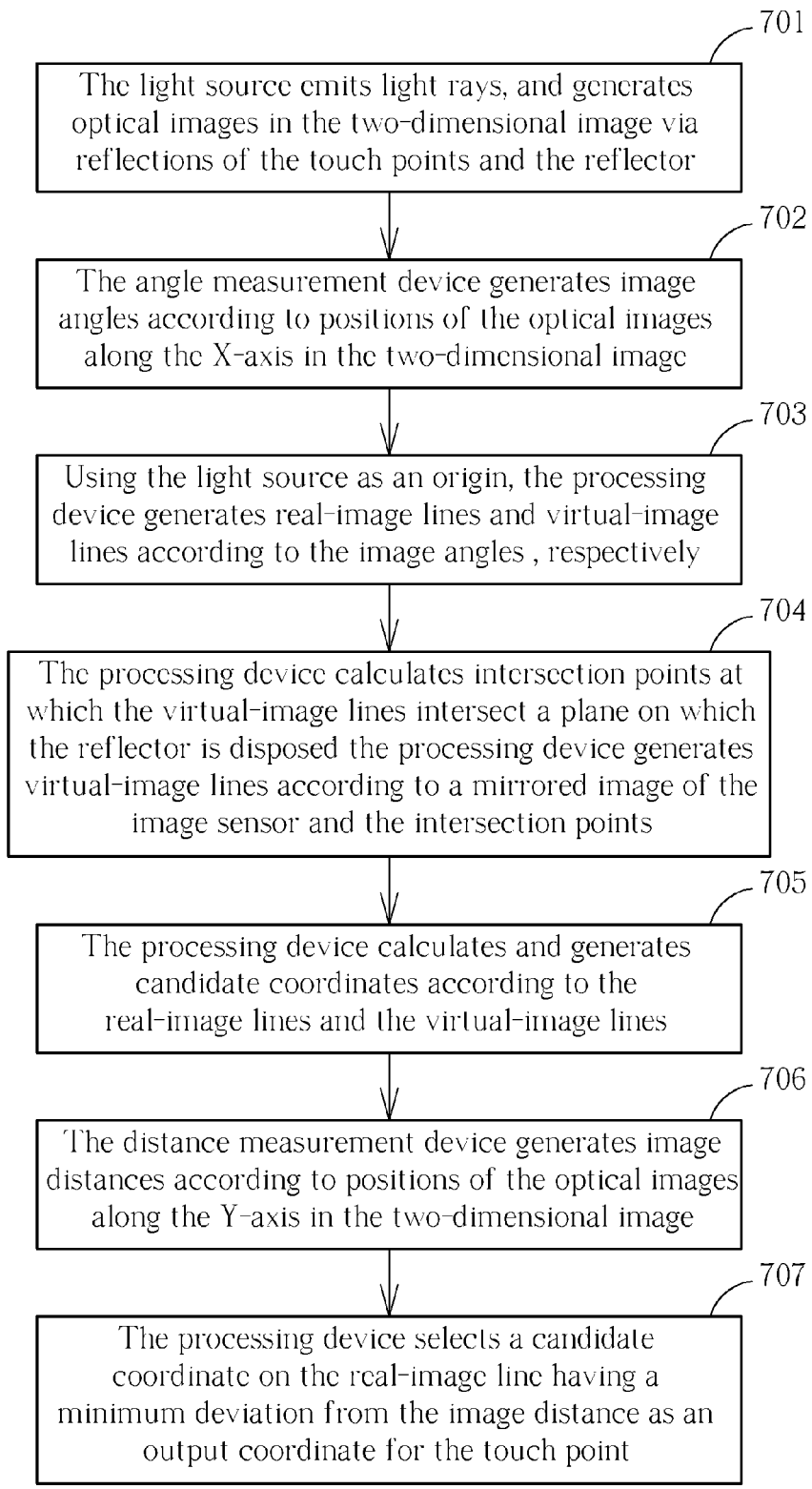
FIG. 7 is a flowchart of a process of the optical touch display system detecting a touch point position according to the second embodiment of the present invention.
Figure 8:
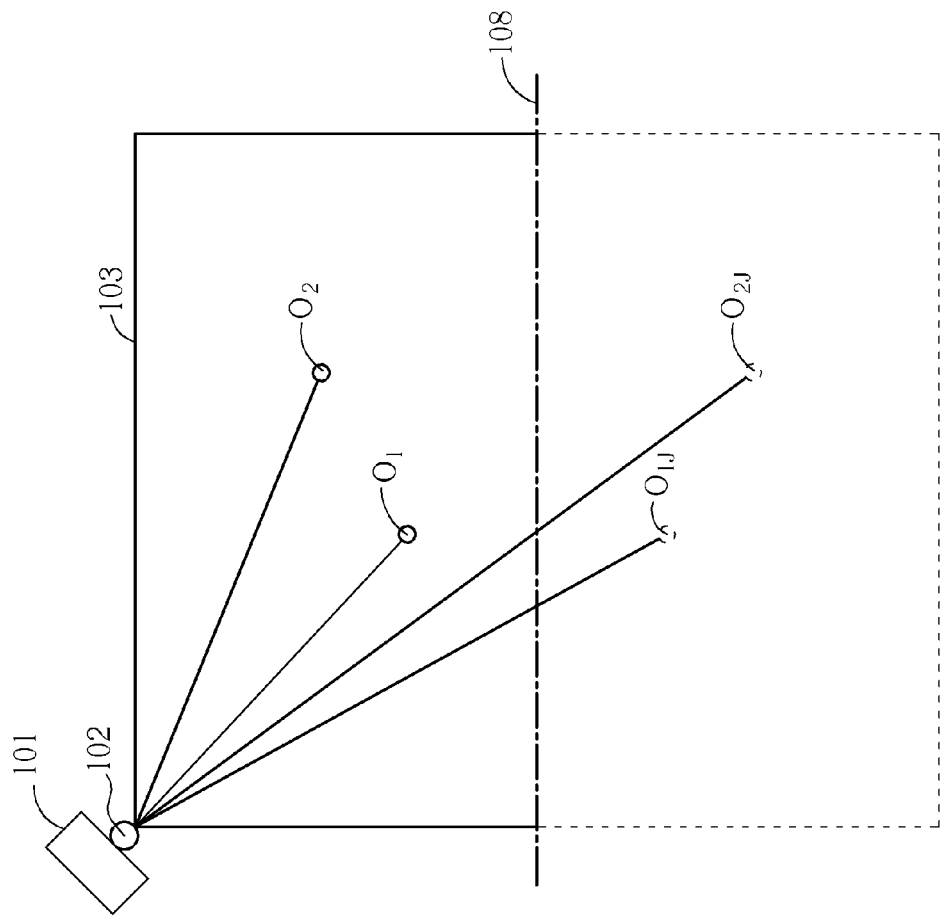
FIGS. 8-12 are schematic diagrams illustrating the process shown in FIG. 7.
Figure 8:
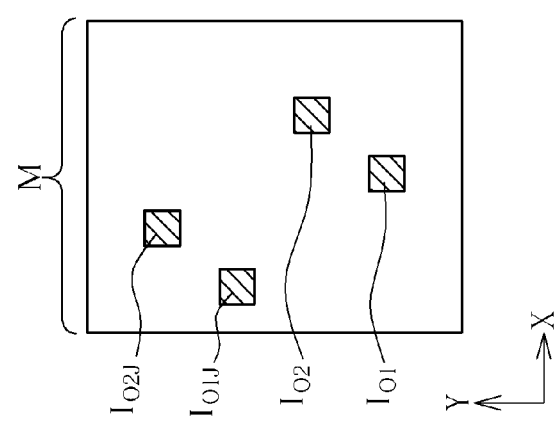

Please refer to FIG. 7, which is a flowchart of a process illustrating the optical touch display system 600 detecting the position of the touch point. For simplicity, the following describes a case with two touch points $O_1$, $O_2$. Moreover, steps disclosed in FIG. 7 merely serve illustrative purposes. In practice, operations do not need to follow the steps as disclosed in FIG. 7. The steps of the process are as follows:

Step 701: The light source 102 emits light rays, and generate optical images $I_{O1}$, $I_{O2}$, $I_{O1J}$, $I_{O2J}$ in the two-dimensional image F via reflections of the touch points $O_1$, $O_2$, and the reflector, wherein $I_{O1J}$ and $I_{O2J}$ are mirrored images (virtual images) of the touch points $O_1$ and $O_2$, respectively; refer to FIG. 8; dashed-lined areas in FIG. 8 represent mirrored images produced by the reflector 108 reflecting the light rays of the light source 102, wherein the touch points $O_1$, $O_2$ correspond to mirrored images $O_{1J}$ and $O_{2J}$, respectively. Therefore, the image sensor 101 sees four optical images $I_{O1}$, $I_{O2}$, $I_{O1J}$ and $I_{O2J}$, wherein $O_{1J}$ and $O_{2J}$ are virtual images, as shown by the two-dimensional image F in FIG. 8.

Figure 9:
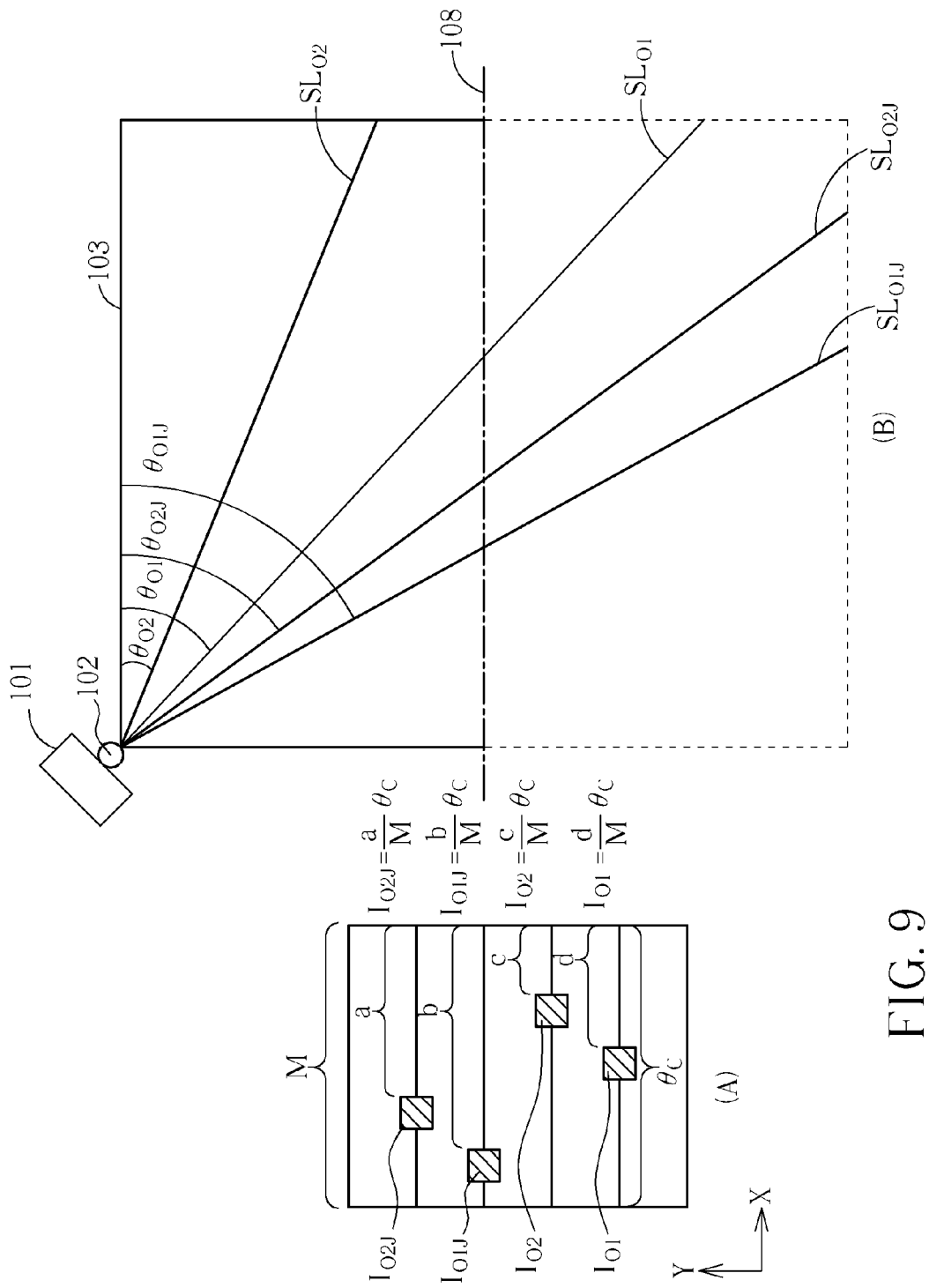

Step 702: The angle measurement device 106 generates image angles $\theta_{O1}$, $\theta_{O2}$, $\theta_{O1J}$, and $\theta_{O2J}$ according to positions of the optical images $I_{O1}$, $I_{O2}$, $I_{O1J}$, and $I_{O2J}$ along the X-axis in the two-dimensional image F. Please refer to FIG. 9A.

Step 703: Using the light source 102 as an origin, the processing device 107 generates real-image lines $SL_{O1}$ and $SL_{O2}$, and virtual-image lines $SL_{O1J}$, $SL_{O2J}$ according to the image angles $\theta_{O1}$, $\theta_{O2}$, $\theta_{O1J}$, $\theta_{O2J}$, respectively; please refer to FIG. 9B.

Figure 10:
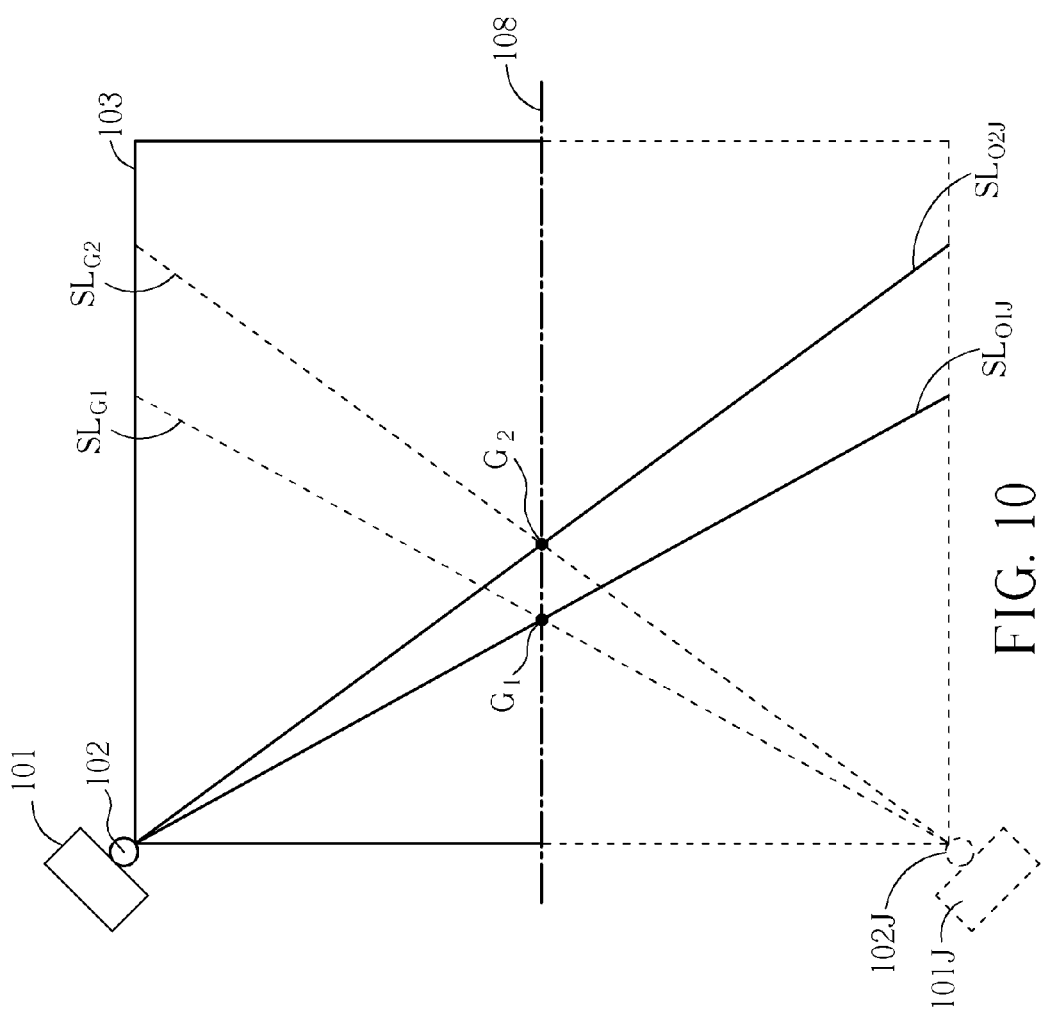

Step 704: The processing device 107 calculates intersection points $G_1$, $G_2$ at which the virtual-image lines $SL_{O1J}$ and $S_{LO2J}$ intersect a plane on which the reflector 108 is disposed; the processing device 107 generates virtual-image lines $SL_{G1}$ and $SL_{G2}$ according to a mirrored image $101_J$ of the image sensor 101 (or a mirrored image $102_J$ of the light source 102), and the intersection points $G_1$, $G_2$; please refer to FIG. 10.

Figure 11:
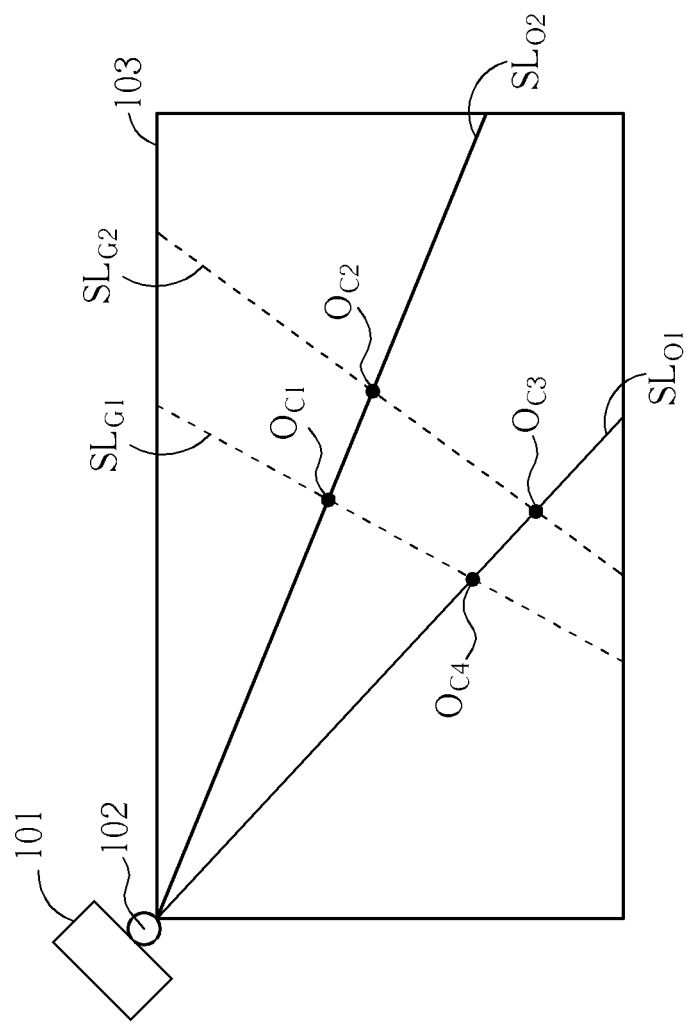

Step 705: The processing device 107 calculates and generates four candidate coordinates $O_{C1}$, $O_{C2}$, $O_{C3}$ and $O_{C4}$ according to the real-image lines $SL_{O1}$, $SL_{O2}$ and the virtual-image lines $SL_{G1}$, $SL_{G2}$; please refer to FIG. 11.

Figure 12:
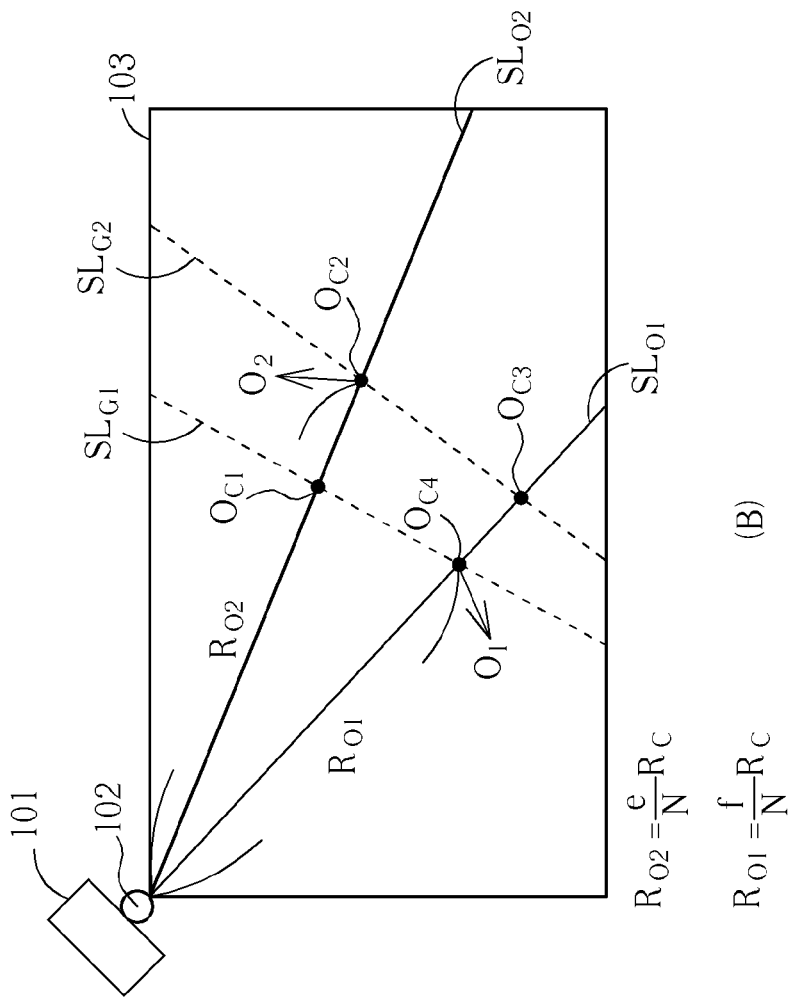
Figure 12:
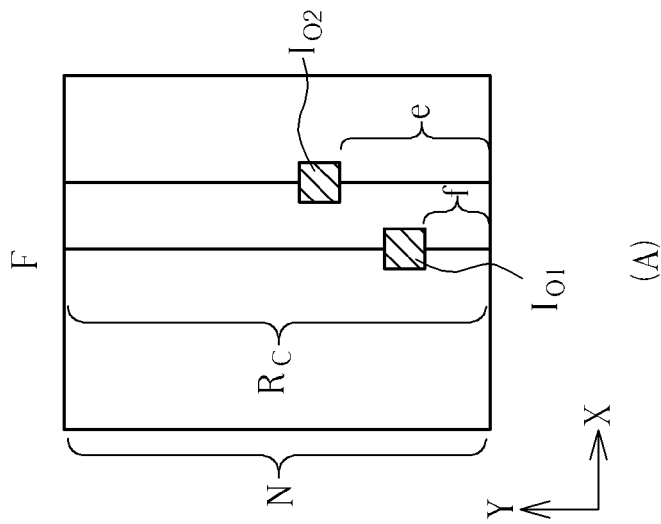

Step 706: The distance measurement device 105 generates image distances $R_{O1}$, $R_{O2}$ according to positions of the optical images $I_{O1}$, $I_{O2}$ along the Y-axis in the two-dimensional image F; please refer to FIG. 12A.

Step 707: The processing device 107 selects a candidate coordinate on the real-image line $SL_{O1}$ having a minimum deviation from the image distance $R_{O1}$ as an output coordinate for the touch point $O_1$; please refer to FIG. 12B; the processing device 107 selects a candidate coordinate on the real-image line $SL_{O2}$ having a minimum deviation from the image distance $R_{O2}$, as an output coordinate for the touch point $O_2$; please refer to FIG. 12B.

As can be seen from the above, the optical touch display system 600 may first measure the image angle via the image sensor 101 and the reflector 108, then determine the coordinate with minimum deviation within the candidate coordinates according to the distance measured by the distance measurement device 105, and then output the coordinate as the final output coordinate of the touch point.

Moreover, the image distance measured by the measurement device 105 can only be used in steps 707, 708 to determine the output coordinates within the candidate coordinates; therefore, extremely high measurement accuracy for the image distance is not required. In reality, the output coordinates of the touch points may still be calculated and decided by the processing device 107 using the measured angle.

Furthermore, the real image determination device 170 determines whether the optical images on the image sensor 101 corresponding to the optical images in the touch region are real images or virtual images. More specifically, the real image determination device 170 is capable of determining whether an optical image X is a real image, according to whether a measured image distance $R_X$ and image angle $\theta_X$ of the optical image X satisfies a predefined relationship. For example, the optical image X is determined to be a real image if the predefined relationship between the image distance $R_X$ and the image angle $\theta_X$ is satisfied, such that coordinates of the optical image X fall within a range of the touch region 103. Conversely, the optical image X is determined as a virtual image.

Figure 13:
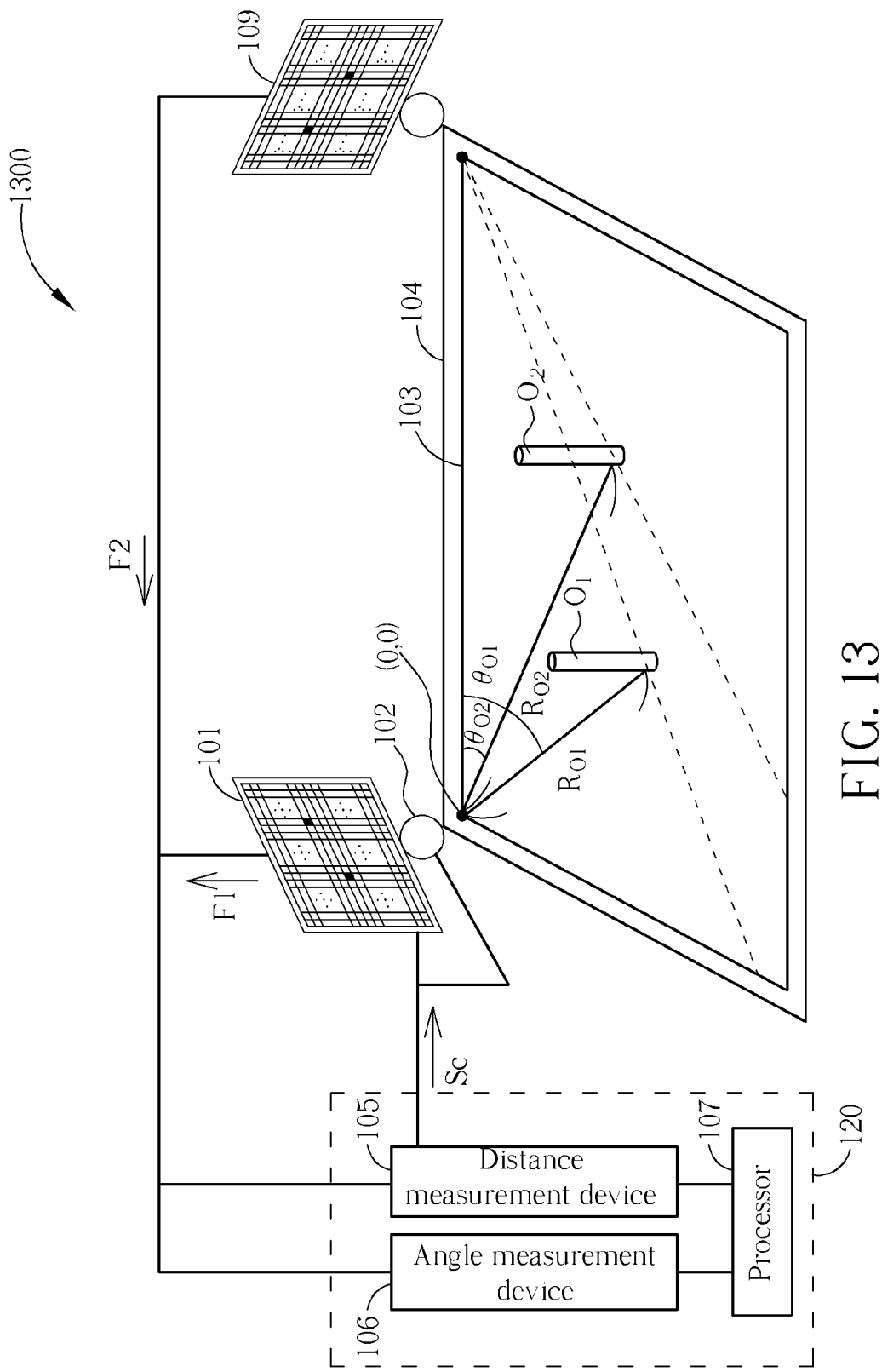
FIG. 13 is a schematic diagram of an optical touch display system according to a third embodiment of the present invention.

Please refer to FIG. 13, which is a schematic diagram of an optical touch display system 1300 according a third embodiment of the present invention. Compared with the optical touch display system 100, the optical touch display system 1300 is configured with an extra image sensor 109 with functionalities similar to that of the reflector 108, mainly for enhancing accuracy of determining the positions of the touch points. Preferably, the image sensor 109 may be disposed at the top-right corner of the touch region 103. Operations of the optical touch display system 1300 are similar to that of the optical touch display system 600, and details of which are provided in the following.

Figure 14:
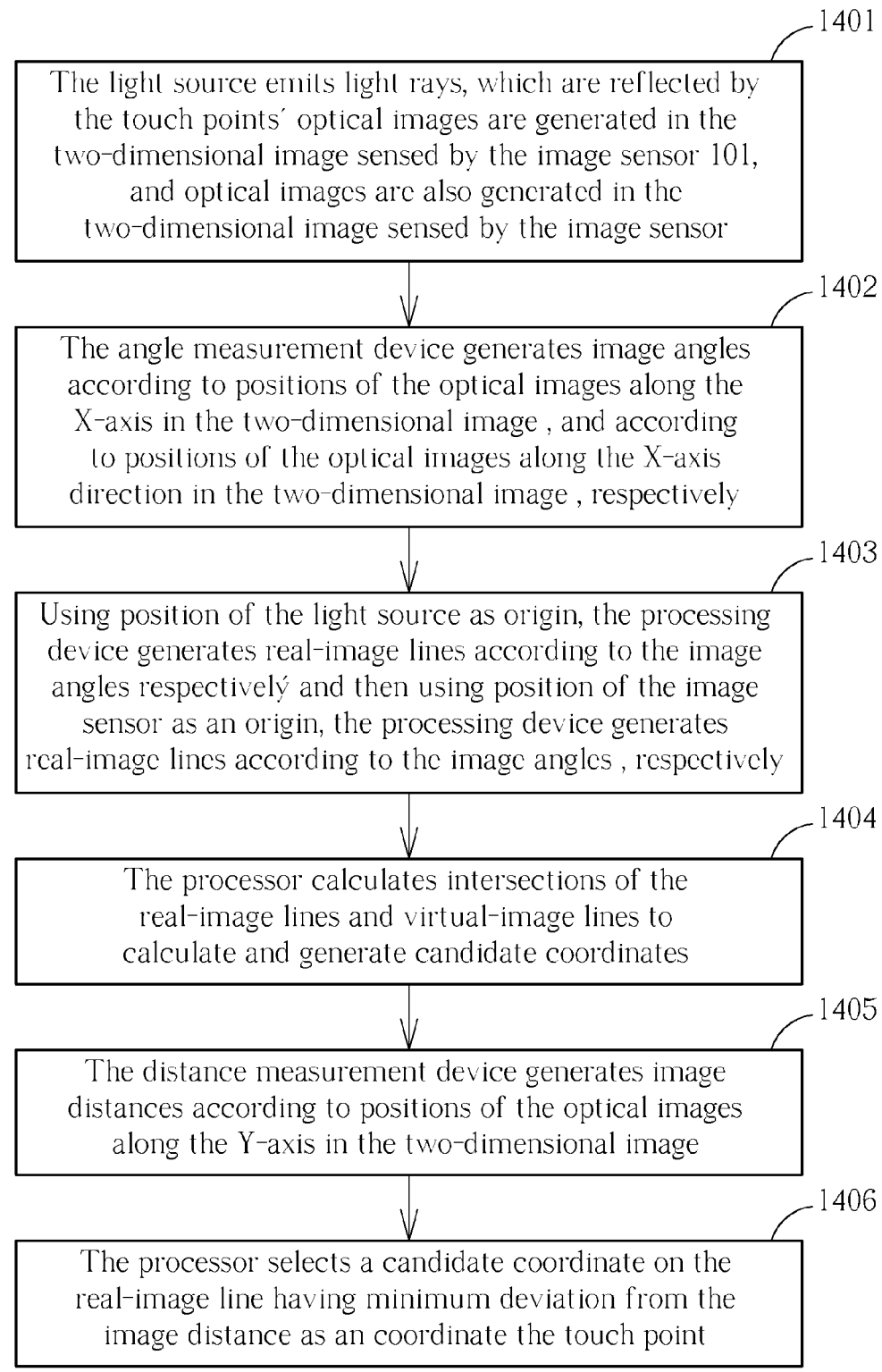
FIG. 14 is a flowchart of a process of the optical touch display system detecting a touch point position according to the third embodiment of the present invention.
Figure 15:
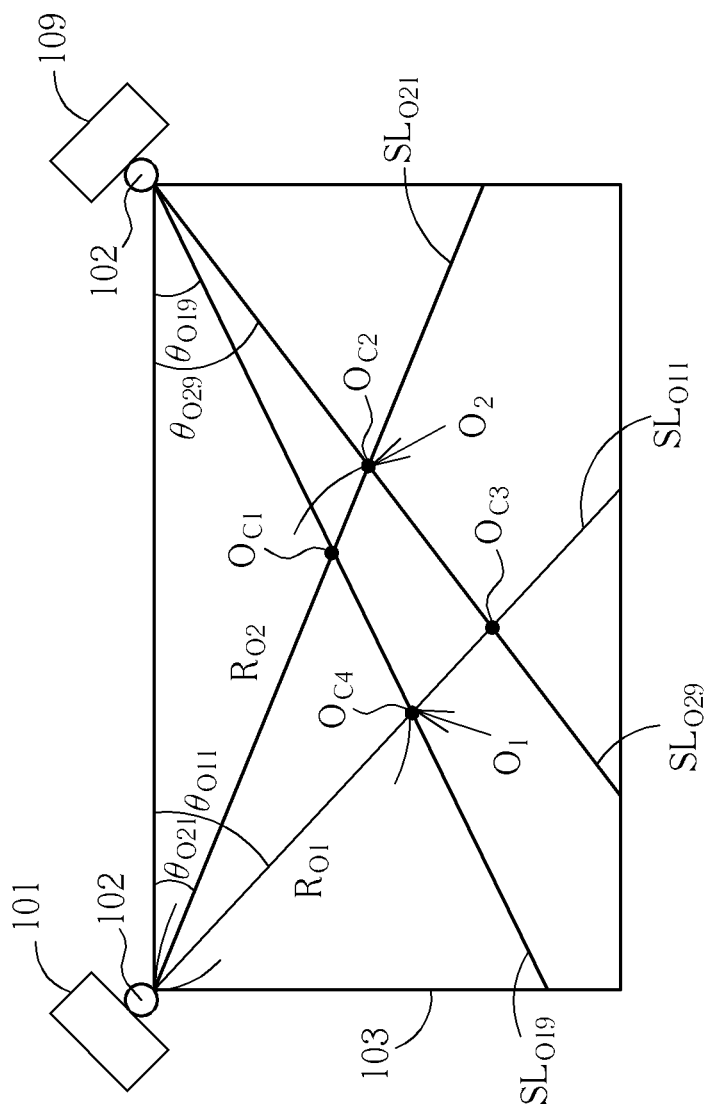
FIG. 15 is a schematic diagram illustrating the process shown in FIG. 14.

Please refer to FIGS. 14 and 15. FIG. 14 illustrates a process through which the optical touch display system 1300 detects a position of a touch point. FIG. 15 is a schematic diagram illustrating the process shown in FIG. 14. Moreover, steps of the process disclosed in FIG. 14 merely serve illustrative purposes. In practice, operations do not need to follow the process disclosed in FIG. 14. The steps of the process are as follows:

Step 1401: The light source 102 emits light rays, which are reflected by the touch points $O_1$ and $O_2$; optical images $I_{O11}$, $I_{O21}$ are generated in the two-dimensional image $F_1$ sensed by the image sensor 101, and optical images $I_{O19}$, $I_{O29}$ are also generated in the two-dimensional image $F_2$ sensed by the image sensor 109.

Step 1402: The angle measurement device 106 generates image angles $\theta_{O11}$, $\theta_{O21}$, $\theta_{O19}$, and $\theta_{O29}$ according to positions of the optical images $I_{O11}$, $I_{O21}$ along the X-axis in the two-dimensional image $F_1$, and according to positions of the optical images $I_{O19}$, $I_{O29}$ along the X-axis direction in the two-dimensional image $F_2$, respectively; note that the image sensor 109 is the origin for the angles $\theta_{O19}$, $\theta_{O29}$.

Step 1403: Using position of the image sensor 101 as origin, the processing device 107 generates real-image lines $SL_{O11}$ and $SL_{O21}$, according to the image angles $\theta_{O11}$, $\theta_{O21}$, respectively; and then using position of the image sensor 109 as an origin, the processing device 107 generates real-image lines $SL_{O19}$ and $SL_{O29}$ according to the image angles $\theta_{O19}$, $\theta_{O29}$, respectively.

Step 1404: Next, the processor 107 calculates intersections of the real-image lines $SL_{O11}$, $SL_{O21}$, $SL_{O19}$, $SL_{O29}$ and virtual-image lines $SL_{G1}$, $SL_{G2}$, to calculate and generate four candidate coordinates $O_{C1}$, $O_{C2}$, $O_{C3}$ and $O_{C4}$.

Step 1405: The distance measurement device 105 generates image distances $R_{O11}$, $R_{O21}$ according to positions of the optical images $I_{O11}$, $I_{O21}$ along the Y-axis in the two-dimensional image $F_1$.

Step 1406: The processor 107 selects a candidate coordinate on the real-image line $SL_{O11}$ having minimum deviation from the image distance $R_{O11}$ as an output coordinate for the touch point $O_1$; the processor 107 selects a candidate coordinate on the real-image line $SL_{O21}$ having minimum deviation from the image distance $R_{O21}$ as an output coordinate for the touch point $O_2$.

As can be seen from the above, the optical touch display system 1300 may first measure the image angles via the image sensors 101 and 109, then determine the coordinate within the candidate coordinates with minimum deviation according to the distance measured by the distance measurement device 105, and then output the coordinate as the final output coordinate of the touch point.

Moreover, the image distance measured by the measurement device 105 can only be used in steps 1407, 1408 to determine the output coordinates within the candidate coordinates; therefore, extremely high measurement accuracy for the image distance is not required. In reality, the output coordinates of the touch points may still be calculated and decided by the processing device 107 using the measured angles.

Figure 16:
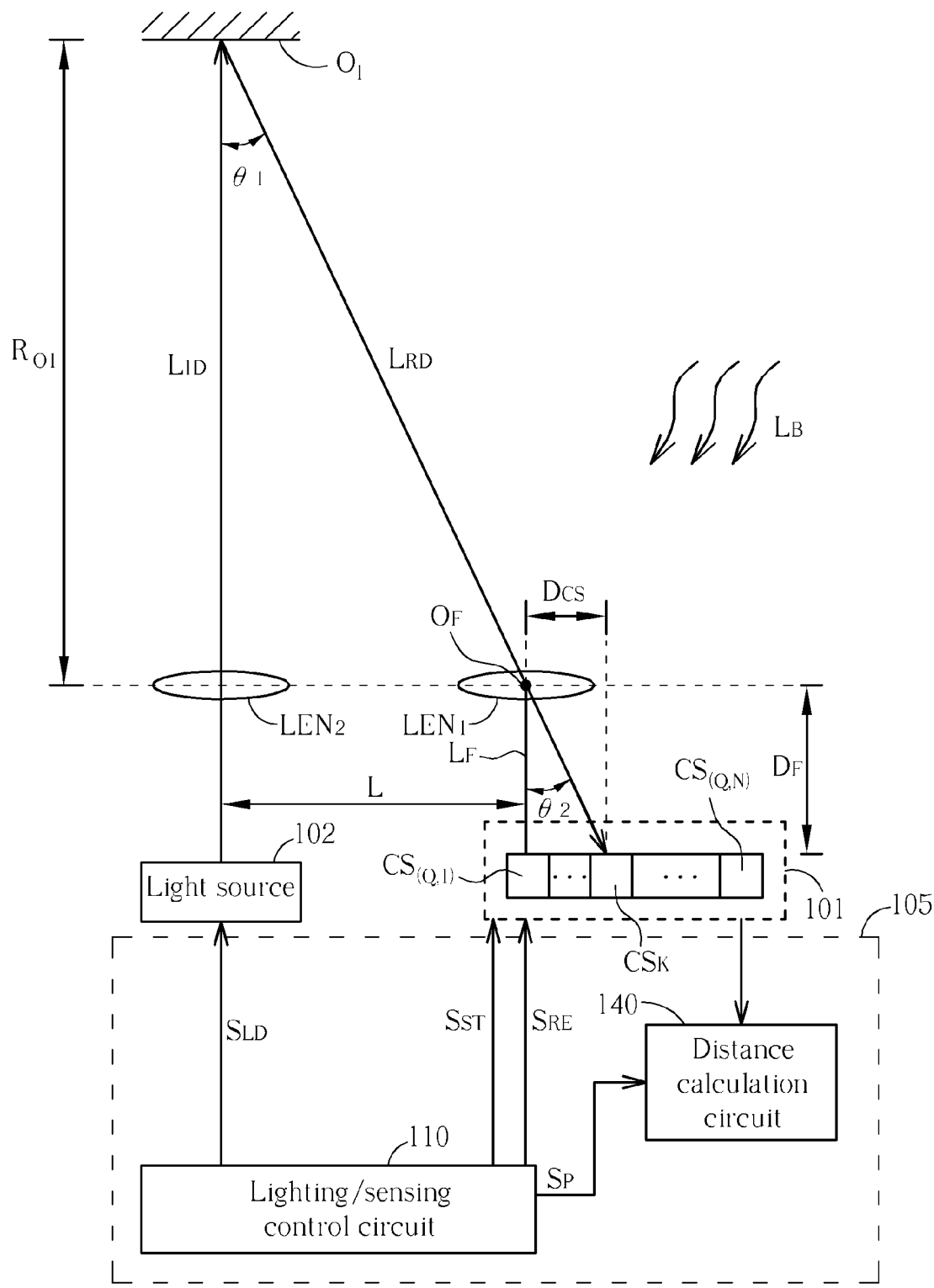
FIGS. 16 and 17 are schematic diagrams illustrating structure and operation of a distance measurement device according to the present invention.
Figure 17:
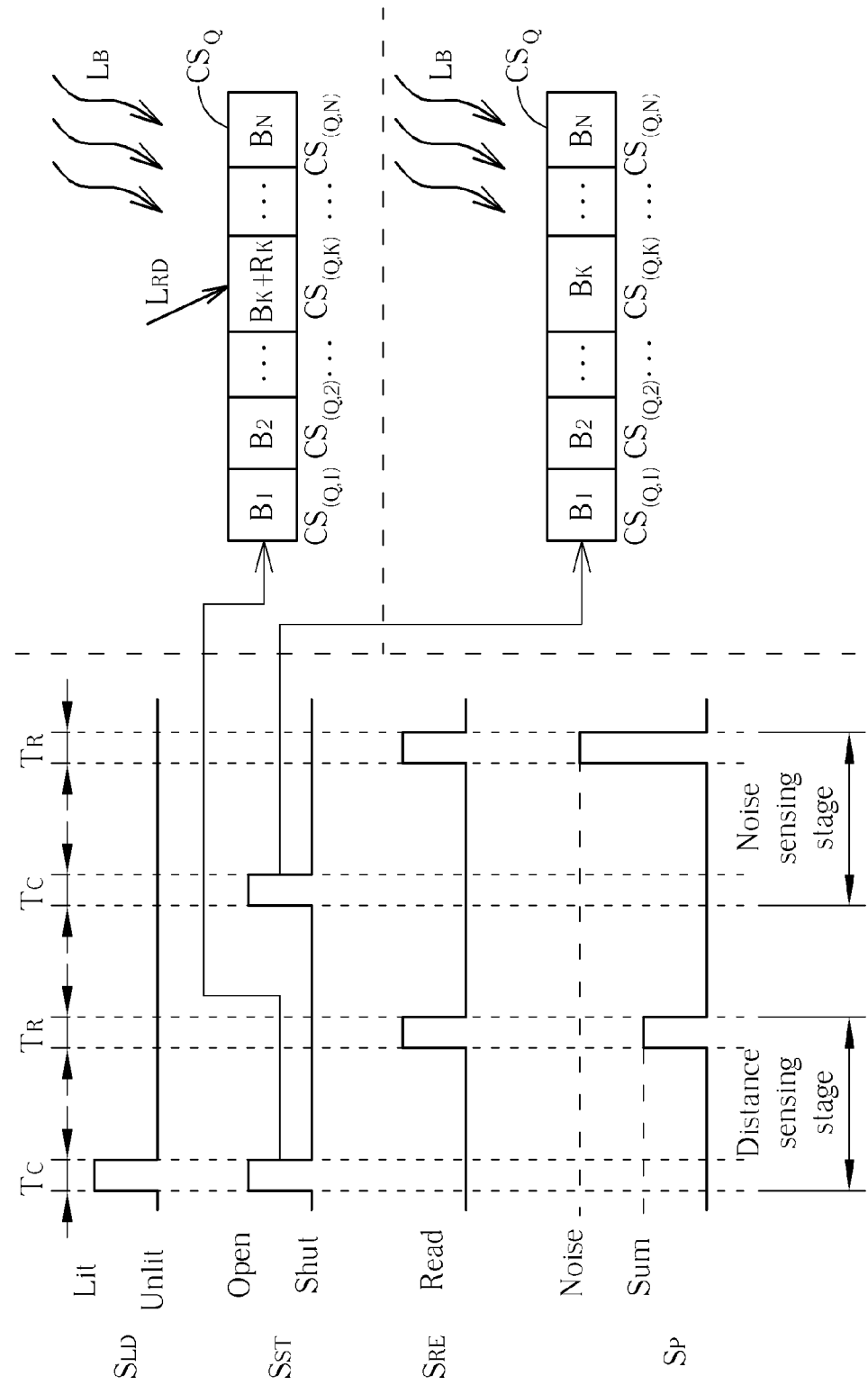

Please refer to FIGS. 16 and 17, which are schematic diagrams illustrating structure and operations of the distance measurement device 105 according to the present invention. Disposed as shown in FIG. 1, the distance measurement device 105 measures the image distance $R_{O1}$ between the touch point $O_1$ and the light source 102. The distance measurement device 105 includes a lighting/sensing control circuit 110 and a distance calculation circuit 140. The lighting/sensing control circuit 110 generates a control signal $S_C$ to control the light source 102 and the image sensor 101. Connections of internal components in the distance measurement device 105 are shown in FIG. 1, and not reiterated herein. Moreover, to enhance accuracy, it is possible to further dispose lenses $LEN_1$ and $LEN_2$ in front of the image sensor 101 and the light source 102, respectively.

The control signal $S_C$ generated by the lighting/sensing control circuit 110 includes a light pulse signal $S_{LD}$, a shutter pulse signal $S_{ST}$, phase signal $S_P$, read signal $S_{RE}$, and known distance signal $S_D$. Distance measurement performed by the distance measurement device 105 may be divided into two stages: 1. Distance sensing stage; and 2. Noise sensing stage. During the distance sensing stage, the lighting/sensing control circuit 110 of the distance measurement device 105 simultaneously generates the light pulse signal $S_{LD}$ representing "lit" and the shutter pulse signal $S_{ST}$ representing "open", both with a pulse width of $T_C$; then the lighting/sensing control circuit 110 simultaneously generates the read signal $S_{RE}$ representing "read" and the phase signal Sp representing "sum", both with a pulse width of $T_R$. When the distance measurement device 105 is in the noise sensing stage, the lighting/sensing control circuit 110 generate the shutter pulse signal $S_{ST}$ representing "open" and simultaneously, the light pulse signal $S_{LD}$ representing "unlit", and the shutter pulse signal has a pulse width of $T_C$; then the lighting/sensing control circuit 110 simultaneously generates the read signal $S_{RE}$ representing "read" and the phase signal Sp representing "noise", both with a pulse width of $T_R$.

The light source 102 is controlled by the lighting/sensing control circuit 110, and used for emitting a detecting light ray $L_{ID}$ to the touch point $O_1$ according to the light pulse signal $S_{LD}$, such that the touch point $O_1$ generates a reflecting light ray $L_{RD}$. More specifically, when the light pulse signal $S_{LD}$ represents "lit", the light source 102 emits the detection light ray $L_{ID}$ to the touch point $O_1$; when the light pulse signal $S_{LD}$ represents "unlit", the light source 102 does not emit the detection light ray $L_{ID}$.

Take a column of the image sensor 101 as an example, e.g. a Q-th sensing column $CS_Q$ includes N sensing units $CS_{(Q,1)} \sim CS_{(Q,N)}$ set side-by-side, each sensing unit having a height equal to a pixel height $H_{PIX}$, i.e. the N sensing units $CS_{(Q,1)} \sim CS_{(Q,N)}$ set side-by-side measure a total width of $N \times H_{Pix}$. The sensing units $CS_{(Q,1)} \sim CS_{(Q,N)}$ are for detecting an energy of the light rays converged by the lens $LEN_1$ according to the shutter pulse signal $S_{ST}$. More specifically, when the shutter pulse signal $S_{ST}$ represents "open", the sensing units $CS_{(Q,1)} \sim CS_{(Q,N)}$ detect the energy of the light rays converged by the lens $LEN_1$ (e.g. background light ray $L_B$ or reflected light ray $L_{RD}$) to generate the light sensing signal accordingly; when the shutter pulse signal $S_{ST}$ represents "shut", the sensing units $CS_{(Q,1)} \sim CS_{(Q,N)}$ do not detect the energy of the light rays converged by the lens $LEN_1$. For example, when the shutter pulse signal $S_{ST}$ represents "open", the sensing unit $CS_{(Q,1)}$ senses the energy of the light rays converged by the lens $LEN_1$ to generate a light sensing signal $S_{LS1}$ accordingly; the sensing unit $CS_{(Q,2)}$ senses the energy of the light rays converged by the lens $LEN_1$ to generate a light sensing signal $S_{LS2}$; similarly, the sensing unit $CS_{(Q,N)}$ senses the energy of the light rays converged by the lens $LEN_1$ to generate light sensing signal $S_{LSN}$. Moreover, when the read signal $S_{RE}$ represents "read", the sensing units $CS_{(Q,1)} \sim CS_{(Q,N)}$ output the light sensing signals $S_{LS1} \sim S_{LSN}$, respectively, forming the image signal for the Q-th column of the two-dimensional image F.

The distance calculation circuit 140 includes a plurality of storage units, used for storing the light sensing signals $S_{LS1} \sim S_{LSN}$ outputted by the sensing units $CS_{(Q,1)} \sim CS_{(Q,N)}$, respectively, and for setting properties of the received light sensing signals according to the phase signal $S_P$. In this embodiment, the distance calculation circuit 140 includes N storage units $M_1 \sim M_N$ as an example. When the phase signal Sp represents "sum", the storage units $M_1 \sim M_N$ set the received light sensing signals $S_{LS1} \sim S_{LSN}$ as positive, i.e. the receive light sensing signals $S_{LS1} \sim S_{LSN}$ represent "sum" according to the phase signal $S_P$, and are marked as positive light sensing signals $S_{LS1+} \sim S_{LSN+}$; when the phase signal $S_P$ represents "noise", the storage units $M_1 \sim M_N$ set the received light sensing signals $S_{LS1} \sim S_{LSN}$ as negative, i.e. the receive light sensing signals $S_{LS1} \sim S_{LSN}$ represent "noise" according to the phase signal $S_P$ and are marked as negative light sensing signals $S_{LS1-} \sim S_{LSN-}$. The distance calculation circuit 140 can calculate the image distance $R_{O1}$ according to the positive light sensing signals $S_{LS1+} \sim S_{LSN+}$ and the negative light sensing signals $S_{LS1-} \sim S_{LSN-}$. The following describes operations of the distance calculation circuit 140 calculating the image distance $R_{O1}$.

As shown on the left of FIG. 17, during the distance sensing stage, the lighting/sensing control circuit 110 generates the light pulse signal $S_{LD}$ representing "lit", and the light source 102 emits the detection light ray $L_{ID}$ to the touch point $O_1$, such that the touch point $O_1$ generates the reflected light ray $L_{RD}$. Then, the lighting/sensing control circuit 110 generates the shutter pulse signal $S_{ST}$ representing "open", such that the sensing units $CS_{(Q,1)} \sim CS_{(Q,N)}$ sense the energy of the reflected light ray $L_{RD}$ and of the background light ray $L_B$, and generate the light sensing signals $S_{LS1} \sim S_{LSN}$, respectively. Then, the lighting/sensing control circuit 110 outputs the read signal $S_{RE}$ representing "read", such that the image sensor 101 outputs the light sensing signals $S_{LS1} \sim S_{LSN}$ to the distance calculation circuit 140, and the lighting/sensing control circuit 110 generates the phase signal $S_P$ representing "sum" to indicate to the distance calculation circuit 140 that the received light sensing signals are in the distance sensing stage, i.e. the positive light sensing signals $S_{LS1+} \sim S_{LSN+}$. Set during the distance sensing stage, the reflected light ray $L_{RD}$ mainly converges to form image on the sensing unit $CS_{(Q,K)}$, and values of the positive light sensing signals $S_{LS1+} \sim S_{LSN+}$ received by the distance calculation circuit 140 are as shown in the top-right of FIG. 17, the sensing unit $CS_{(Q,K)}$ simultaneously senses the background light ray $L_B$ and the reflected light ray $L_{RD}$ (i.e. the touch point $O_1$ forms image on the sensing unit $CS_{(Q,K)}$). Therefore, the sensing signal $S_{LSK+}$ equals the accumulated energy $B_K$ of the sensing unit $CS_{(Q,K)}$ sensing the background light ray $L_B$ plus the accumulated energy $R_K$ of the sensing unit $CS_{(Q,K)}$ sensing the reflected light ray $L_{RD}$, whereas other sensing units only receive the background light ray $L_B$. Therefore, the sensing signal $S_{LS1+}$ is equal to an accumulated energy $B_1$ of the sensing unit $CS_{(Q,1)}$ sensing the background light ray $L_B$; the sensing signal $S_{LS2+}$ is equal to an accumulated energy $B_2$ of the sensing unit $CS_{(Q,2)}$ sensing the background light ray $L_B$; similarly, the sensing signal $S_{LSN+}$ is equal to an accumulated energy $B_N$ of the sensing unit $CS_{(Q,N)}$ sensing the background light ray $L_B$.

As shown on the left of FIG. 17, during the noise sensing stage, the lighting/sensing control circuit 110 generates the shutter pulse signal $S_{ST}$ representing "open", such that the sensing units $CS_{(Q,1)} \sim CS_{(Q,N)}$ sense the light rays converged by the lens $LEN_1$, to generate the light sensing signals $S_{LS1} \sim S_{LSN}$. However, the lighting/sensing control circuit 110 would then generate the light pulse signal $S_{LD}$ representing "unlit", and therefore the light source 102 does not emit the detection light ray $L_{ID}$ to the touch point $O_1$, nor does the touch point $O_1$ generate the reflected light ray $L_{RD}$. Then the lighting/sensing control circuit 110 would output the read signal $S_{RE}$ representing "read", such that the image sensor 101 outputs the light sensing signals $S_{LS1}\sim S_{LSN}$ to the distance calculation circuit 140, and the lighting/sensing control circuit 110 generates the phase signal $S_P$ representing "noise" to indicate to the distance calculation circuit 140 that the received light sensing signals are in the noise sensing stage, i.e. the negative light sensing signals $S_{LS1-}\sim S_{LSN-}$. Values of the light sensing signals $S_{LS1-}\sim S_{LSN-}$ received by the distance calculation circuit 140 are as shown in the bottom-right of FIG. 17. The shutter pulse signal $S_{ST}$ has a same pulse width (duration $T_C$) during both the distance sensing stage and the noise sensing stage. Therefore, accumulated energy corresponding to the background light ray $L_B$ of the light sensing signals $S_{LS1}\sim S_{LSN}$ generated by the sensing units $CS_{(Q,1)}\sim CS_{(Q,N)}$ during the distance sensing stage and the noise sensing stage would be the same. In other words, the accumulated energy of the background light ($B_1\sim B_N$) would be the same within the positive light sensing signals $S_{LS1+}\sim S_{LSN+}$ as within the negative light sensing signals $S_{LS1-}\sim S_{LSN-}$.

After the distance sensing stage and the noise sensing stage, the lighting/sensing control circuit 110 generates the phase signal Sp representing "distance calculation". The distance calculation circuit 140 would subtract the negative light sensing signals from the positive light sensing signals in the storage units, and select the storage units with maximum stored values after subtraction, to determine the position of the image formed by the reflected light ray $L_{RD}$ on the image sensor 101 accordingly. In other words, values stored in the storage units $M_1\sim M_N$ of the distance calculation circuit 140 equal the values of the positive light sensing signals $S_{LS1+}\sim S_{LSN+}$ subtracted by the values of the negative light sensing signals $S_{LS1-}\sim S_{LSN-}$, respectively. More specifically, the storage unit $M_1$ stores the positive light sensing signal $S_{LS1-}$ and the negative light sensing signals $S_{LS1-}$, and since both the positive light sensing signal $S_{LS1+}$ and the negative light sensing signal $S_{LS1-}$ equals $B_1$, the value stored in the storage unit $M_1$ after subtraction would be zero; the storage unit $M_2$ stores the positive light sensing signal $S_{LS2+}$ and the negative light sensing signals $S_{LS2-}$, and since both the positive light sensing signal $S_{LS2+}$ and the negative light sensing signal $S_{LS2-}$ equals $B_2$, the value stored in the storage unit $M_2$ after subtraction would be zero, and so forth. Similarly, the storage unit MK stores the positive light sensing signal $S_{LSK+}$ and the negative light sensing signal $S_{LSK-}$, and since the positive light sensing signal $S_{LS2+}$ equals ($B_K+R_K$) and the negative light sensing signals $S_{LS2-}$ equals $B_K$, the value stored in the storage unit $M_K$ after subtraction would be $R_K$; the storage unit $M_N$ stores the positive light sensing signal $S_{LSN+}$ and the negative light sensing signals $S_{LSN-}$, and since both the positive light sensing signal $S_{LSN+}$ and the negative light sensing signal $S_{LSN-}$ equals $B_N$, the value stored in the storage unit $M_N$ after subtraction would be zero. In other words, within the storage units $M_1$-$M_N$, the value of storage unit $M_K$ equals $R_K$, while values of all the other storage units equal zero; therefore, the distance calculation circuit 140 may select the storage unit $M_K$ accordingly, i.e. the light sensing signal stored by the storage unit $M_K$ has an energy corresponding to the reflected light ray $L_{RD}$. Since the storage unit MK stores the light sensing signal generated by the sensing unit $CS_{(Q,K)}$, the distance calculation circuit 140 may determine that the reflected light ray $L_{RD}$ generated by the touch point $O_1$ mainly converges to form an image at the sensing unit $CS_{(Q,K)}$. As such, the distance calculation circuit 140 may accordingly further derive an image position $D_{CS}$ of the reflected light ray $L_{RD}$ in FIG. 16, from the following equation:

$$D_{CS}=K\times H_{PIX} \qquad (1);$$

Moreover, in FIG. 16, the line $L_F$ formed between a focal point $O_F$ of the lens $LEN_1$ and the sensing unit $CS_{(Q,1)}$ is parallel to the detection light ray $L_{ID}$; therefore, an angle $\theta_1$ formed by the detection light ray $L_{ID}$ and the reflected light ray $L_{RD}$ equals an angle $\theta_2$ formed by the $L_F$ and the reflected light ray $L_{RD}$. In other words, a relationship between $\tan\theta_1$ and $\tan\theta_2$ may be expressed as follows:

$$\tan\theta_1=L/D_M=\tan\theta_2=D_{CS}/D_F \qquad (2);$$

wherein L represents a predefined distance between the light source 102 and the image sensor 101 (the detection light ray $L_{ID}$ and the line $L_F$), $D_{CS}$ represents the image position of the reflected light ray $L_{RD}$, $D_F$ represents a focal distance of the lens $LEN_1$. According to Eqn. (2), the image distance $R_{O1}$ may be expressed as the following:

$$R_{O1}=(D_F\times L)/D_{CS} \qquad (3);$$

Therefore, the distance calculation circuit 140 may first calculate the image position $D_{CS}$ via Eqn. (1), then calculate the image distance $R_{O1}$ via Eqn. (3) according to the predefined distance L and the focal distance $D_F$.

Simply put, in the distance measurement device 105, the lighting/sensing control circuit 110 controls the light source 102 to emit the detection light ray $L_{ID}$ to the touch point $O_1$ during the distance sensing stage, and the sensing units $CS_{(Q,1)}\sim CS_{(Q,N)}$ sense the light rays converged by the lens $LEN_1$ (e.g. the reflected light ray $L_{RD}$ and the background light ray $L_B$), to generate the positive light sensing signals $S_{LS1+}\sim S_{LSN+}$ accordingly, which are stored in the storage units $M_1\sim M_N$. During the noise sensing stage, the lighting/sensing control circuit 110 controls the light source 102 to not emit the detection light ray $L_{ID}$, and the sensing units $CS_{(2,1)}\sim CS_{(Q,N)}$ sense the light rays converged by the lens $LEN_1$ (e.g. the reflected light ray $L_{RD}$ and the background light ray $L_B$), to generate the negative light sensing signals $S_{LS1-}\sim S_{LSN-}$ accordingly, which are stored in the storage units $M_1\sim M_N$. At this point, values stored in the storage units $M_1\sim M_N$ would equal the positive light sensing signals $S_{LS1+}\sim S_{LSN+}$ subtracted by the negative light sensing signals $S_{LS1-}\sim S_{LSN-}$. Therefore, the value of the storage unit $M_K$ corresponding to the sensing unit $CS_{(Q,K)}$ at which the reflected light ray $L_{RD}$ converges would be higher than that of the other storage units. As such, the distance calculation circuit 140 may determine the sensing unit $CS_{(Q,K)}$ at which the reflected light ray $L_{RD}$ converges, and calculate the image position $D_{CS}$ of the reflected light ray $L_{RD}$ accordingly. Therefore, the distance calculation circuit 140 may calculate the image distance $R_{O1}$ according to the image position $D_{CS}$, the focal distance $D_F$ of the lens $LEN_1$, and the predefined distance L.

In summary, the optical touch display system of the present invention is capable of determining true coordinates for each of multiple touch points via verification by the distance measurement device. Therefore, the optical touch display system of the present invention may be utilized in multi-touch applications and can accurately determine the position of each touch point, providing the user with more convenient operation.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. An optical touch display system, comprising:
   a touch region;
   a light source, on a periphery of the touch region, the light source positioned at least partially above the touch region, such that light rays emitted from the light source may traverse the touch region;
   an image sensor, disposed above the light source, for receiving light rays of the light source, reflected from a touch point on the touch region, and generating a two-dimensional image accordingly, wherein the image sensor is a light sensing array containing M columns and N rows of sensing units for generating the two-dimensional image having a resolution of M×N, where M and N are both integers greater than or equal to two;
   a first lens, the first lens for converging a background light or light rays reflected from the first touch point, wherein the image sensor senses an energy of the light converged by the first lens to generate M light sensing signals;
   wherein the two-dimensional image comprises a set of optical images corresponding to the touch point, a first optical image of the set of optical images corresponds to a first touch point of the touch point, and a first image distance of the set of image distances and a first image angle of the set of image angles correspond to the first optical image;
   a distance measurement device, connected to the light source and the image sensor, for controlling the light source and the image sensor, and generating a set of image distances corresponding to the set of optical images according to coordinates of the set of optical images in the two-dimensional image along a first direction along a Y-axis of the set of optical images in the two-dimensional image, the distance measurement device comprising:
      a lighting/sensing control circuit, connected to the light source, for controlling the light source to emit light during a distance sensing stage, while controlling the image sensor to sense the energy of the light converged by the first lens to generate M first light sensing signals, and controlling the light source to not emit light during a noise sensing stage, while controlling the image sensor to sense the energy of the light converged by the first lens to generate M second light sensing signals; and
      a distance calculation circuit, connected to the image sensor, for determining an image position of the light rays reflected from the first touch point along the first direction of the image sensor according to the M first light sensing signals and the M second light sensing signals, and calculating the first image distance according to the image position, a focal distance of the first lens, a predefined distance between the light source and the image sensor;
   an angle measurement device, connected to the image sensor, for generating a set of image angles corresponding to the set of optical images according to coordinates of the set of optical images in the two-dimensional image along a second direction; and
   a processor, for generating a set of output coordinates according to the set of image distances and the set of image angles.

2. The optical touch display system of claim 1, wherein the distance calculation circuit calculates the first image distance according to the following equation:

$$R_{O1}=(D_F \times L)/D_{CS};$$

wherein $R_{O1}$ represents the first image distance, $D_F$ represents the focal distance of the first lens, L represents the predefined distance between the light source and the image sensor, $D_{CS}$ represents the image position.

3. The optical touch display system of claim 1, wherein the image sensor is disposed at a corner of the touch region.

4. An optical touch display system, comprising:
   a touch region;
   a light source, on a periphery of the touch region, the light source positioned at least partially above the touch region, such that light rays emitted from the light source may traverse the touch region;
   an image sensor, disposed above the light source, for receiving light rays of the light source, reflected from a touch point on the touch region, and generating a two-dimensional image accordingly;
   wherein the two-dimensional image comprises a set of optical images corresponding to the touch point, and a first optical image of the set of optical images corresponds to a first touch point of the touch point;
   a first lens, the first lens for converging a background light or light rays reflected from the first touch point, the image sensor for sensing an energy of the light converged by the first lens, to generate M light sensing signals;
   a distance measurement device, connected to the light source and the image sensor, for controlling the light source and the image sensor, and generating a set of image distances corresponding to the set of optical images according to coordinates of the set of optical images in the two-dimensional image along a first direction, wherein a first image distance of the set of image distances corresponds to the first optical image, the distance measurement device comprising:
      a lighting/sensing control circuit, connected to the light source, for controlling the light source to emit light during a distance sensing stage, while controlling the image sensor to sense the energy of the light converged by the first lens to generate M first light sensing signals, and controlling the light source to not emit light during a noise sensing stage, while controlling the image sensor to sense the energy of the light converged by the first lens to generate M second light sensing signals;
      wherein M is an integer; and
      a distance calculation circuit, connected to the image sensor, for determining an image position of the light rays reflected from the first touch point along the first direction of the image sensor according to the M first light sensing signals and the M second light sensing signals, and calculating the first image distance according to the image position, a focal distance of the first lens, a predefined distance between the light source and the image sensor;
   an angle measurement device, connected to the image sensor, for generating a set of image angles corresponding to the set of optical images according to coordinates of the set of optical images in the two-dimensional image along a second direction, wherein a first image angle of the set of image angles corresponds to the first optical image; and a processor, for generating a set of output coordinates according to the set of image distances and the set of image angles.

5. The optical touch display system of claim 3, wherein the image sensor is disposed at a corner of the touch region.

6. An optical touch display system, comprising:
a touch region;
a light source on a periphery of the touch region, the light source positioned at least partially above the touch region, such that light rays emitted from the light source may traverse the touch region;
an image sensor receiving light rays reflected from a touch point on the touch region and capturing a two-dimensional image having an X-axis and a Y-axis, wherein the image sensor generates M light sensing signals;
a lens converging a background light or light rays reflected from the touch point onto the image sensor; and
a processing device identifying an object image of an object in the two-dimensional image, and calculating a coordinate of the object corresponding to the touch region, wherein the coordinates of the object are measured in the Cartesian coordinate system, wherein an X position of the object image along the X-axis is used to determine an angle of the object with respect to the image sensor and a Y position of the object image along the Y-axis is used to determine a distance of the object from the image sensor, the processing device comprising:
  a distance measurement device, connected to the image sensor, generating the distance according to the coordinate of the object in the two-dimensional image along the Y-axis, wherein the distance measurement device comprises:
    a lighting/sensing control circuit, connected to the light source, for controlling the light source to emit light during a distance sensing stage, while controlling the image sensor to sense energy of the light converged by the lens to generate M first light sensing signals, and controlling the light source to not emit light during a noise sensing stage, while controlling the image sensor to sense the energy of the light converged by the lens to generate M second light sensing signals, wherein M is an integer; and
    a distance calculation circuit, connected to the image sensor, for determining an image position of the light rays reflected from a first touch point along the Y-axis of the image sensor according to the M first light sensing signals and the M second light sensing signals, and calculating the distance according to the image position, a focal distance of the lens, and a predefined distance between the light source and the image sensor;
  an angle measurement device, connected to the image sensor, generating the angle of the object according to the coordinate of the object in the two-dimensional image along the X-axis; and
  a processor, connected to the distance measurement device and the angle measurement device, and generating an output coordinate according to the distance and the angle of the object.

7. The optical touch display system of claim 6, wherein the distance calculation circuit calculates the distance according to the following equation:

$$R_{O1}=(D_F \times L)/D_{CS};$$

wherein $R_{O1}$ represents the distance, $D_F$ represents the focal distance of the lens, L represents the predefined distance between the light source and the image sensor, $D_{CS}$ represents the image position.

8. The optical touch display system of claim 6, wherein the image sensor is disposed at a corner of the touch region.

* * * * *